(12) United States Patent
Liu et al.

(10) Patent No.: US 12,513,750 B2
(45) Date of Patent: Dec. 30, 2025

(54) METHOD AND DEVICE FOR USE IN COMMUNICATION NODE FOR WIRELESS COMMUNICATION

(71) Applicant: Apogee Networks, LLC, Dallas, TX (US)

(72) Inventors: Zheng Liu, Shanghai (CN); Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 388 days.

(21) Appl. No.: 17/368,861

(22) Filed: Jul. 7, 2021

(65) Prior Publication Data

US 2021/0345425 A1 Nov. 4, 2021

Related U.S. Application Data

(63) Continuation of application No. PCT/CN2019/129268, filed on Dec. 27, 2019.

(30) Foreign Application Priority Data

Jan. 11, 2019 (CN) .......................... 201910027128.X

(51) Int. Cl.
*H04W 74/08* (2024.01)
*H04L 1/00* (2006.01)
(Continued)

(52) U.S. Cl.
CPC ....... *H04W 74/0841* (2013.01); *H04L 1/0003* (2013.01); *H04W 72/0446* (2013.01);
(Continued)

(58) Field of Classification Search
CPC ......... H04W 74/0833; H04W 74/0841; H04W 74/006; H04W 72/0446
See application file for complete search history.

(56) References Cited

U.S. PATENT DOCUMENTS

| 10,433,341 B2 | 10/2019 | Liu et al. |
| 2017/0265230 A1 | 9/2017 | Liu et al. |

(Continued)

FOREIGN PATENT DOCUMENTS

| CN | 102291836 A | 12/2011 |
| CN | 108271275 A | 7/2018 |

(Continued)

OTHER PUBLICATIONS

ISR in application PCT/CN2019/129268 dated Feb. 27, 2020.
(Continued)

*Primary Examiner* — Sulaiman Nooristany
(74) *Attorney, Agent, or Firm* — Volpe Koenig

(57) ABSTRACT

The present disclosure provides a method and a device for use in communication node for wireless communications. The communication node transmits a first sequence; receives first information, and the first information is used to determine X candidate time lengths; transmits a second sequence and determines whether to transmit a second radio signal; a time interval between a time for transmitting the first sequence and a time for transmitting the second sequence is not less than a target time length; a first time length is equal to one of the X candidate time lengths, and the target time length is not greater than the first time length; when the first time length is greater than 0, the first communication node randomly selects the target time length between 0 and the first time length. The present disclosure improves random access performance.

17 Claims, 8 Drawing Sheets

(51) Int. Cl.
| | |
|---|---|
| *H04W 72/0446* | (2023.01) |
| *H04W 72/0453* | (2023.01) |
| *H04W 74/0833* | (2024.01) |
| *H04W 74/0836* | (2024.01) |

(52) U.S. Cl.
CPC .................. *H04W 72/0453* (2013.01); *H04W 74/0836* (2024.01); *H04W 74/0833* (2013.01)

(56) References Cited

U.S. PATENT DOCUMENTS

| | | | | |
|---|---|---|---|---|
| 2019/0320467 | A1* | 10/2019 | Freda | H04W 74/004 |
| 2021/0219349 | A1* | 7/2021 | Huang | H04W 74/0833 |
| 2021/0345424 | A1* | 11/2021 | Cirik | H04W 74/02 |
| 2021/0345425 | A1 | 11/2021 | Liu et al. | |

FOREIGN PATENT DOCUMENTS

| | | |
|---|---|---|
| CN | 108282901 A | 7/2018 |
| WO | 2018059185 A1 | 4/2018 |
| WO | 2018063490 A1 | 4/2018 |
| WO | 2018127042 A1 | 7/2018 |

OTHER PUBLICATIONS

Vivo."R2-1905651, Fallback Procedure from2-Step RACH to 4-Step RACH" 3GPp TSG-RAN WG2 Meeting#106.17 May 2019 (May 17, 2019),section 2.

Email.Discussion Rapporteur ZTE."R2-1906308.Procedures and mgsB Content[ 105bis#30][NR/2-Step RACH]"3GPP TSG-WG2 Meeing #106, May 17, 2019 (May 17, 2019),section 2.1, part Q4.

Samsung. "R1-1612468.Discussion on Simplified RACH Procedure" 3GPPTSGRANWG1 Meering#87, Nov. 18, 2016(Nov. 18, 2016).section 2.

LG Electronics Inc"R2-1818098,2-Step RACH Procedure for NR-Li" 3GPP TSG-RAN WG2#103bis. Nov. 16, 2018 (Nov. 16, 2018). entire document.

Sony."R2-1811420, Considerations on Initial Access Procedures for NR Unlicensed Operations" 3GPP TSG-RAN WG2 Meeting #103,Aug. 24, 2018(Aug. 24, 2018).

ZTE Corporationet al."R1-1611274.On2-Step RACH Procedure in NR" 3GPP TSGRAN WG/ Meeting#87.18 Nov. 2016(Nov. 18, 2016).

R1-1700105"2-step Random Access Procedure":5775 3GPP,(access or RACH)and (2-step or two-step)and (4-step or four-step )and resource and preamble Jan. 9, 2017.

CN201910027128.X 1st Office Action dated Aug. 27, 2021.
CN201910027128.X First Search Report dated Aug. 10, 2021.
CN201910027128.X Second Office Action dated Jan. 6, 2022.
CN201910027128.X Second Search Report dated Dec. 28, 2021.
CN201910027128.X Notification to Grant Patent Right for Invention dated Mar. 29, 2022.

NTT Docomo, Inc., "Status Report to TSG," 3GPP TSG RAN meeting #75, RP-170376, Dubrovnik, Croatia (Mar. 6-9, 2017).

Third Generation Partnership Project, "Technical Specification Group Radio Access Network; NR; Physical channels and modulation (Release 15)," 3GPP TS 38.211 V15.3.0 (Sep. 2018).

Third Generation Partnership Project, "Technical Specification Group Radio Access Network; NR; Physical channels and modulation (Release 15)," 3GPP TS 38.211 V15.7.0 (Sep. 2019).

Third Generation Partnership Project, "Technical Specification Group Radio Access Network; NR; Multiplexing and channel coding (Release 15)," 3GPP TS 38.212 V15.3.0 (Sep. 2018).

Third Generation Partnership Project, "Technical Specification Group Radio Access Network; NR; Multiplexing and channel coding (Release 15)," 3GPP TS 38.212 V15.7.0 (Sep. 2019).

Third Generation Partnership Project, "Technical Specification Group Radio Access Network; NR; Physical layer procedures for control (Release 15)," 3GPP TS 38.213 V15.3.0 (Sep. 2018).

Third Generation Partnership Project, "Technical Specification Group Radio Access Network; NR; Physical layer procedures for control (Release 15)," 3GPP TS 38.213 V15.7.0 (Sep. 2019).

Third Generation Partnership Project, "Technical Specification Group Radio Access Network; NR; Physical layer procedures for data (Release 15)," 3GPP TS 38.214 V15.3.0 (Sep. 2018).

Third Generation Partnership Project, "Technical Specification Group Radio Access Network; NR; Physical layer procedures for data (Release 15)," 3GPP TS 38.214 V15.7.0 (Sep. 2019).

Third Generation Partnership Project, "Technical Specification Group Radio Access Network; NR; Medium Access Control (MAC) protocol specification (Release 15)," 3GPP TS 38.321 V15.3.0 (Sep. 2018).

Third Generation Partnership Project, "Technical Specification Group Radio Access Network; NR; Medium Access Control (MAC) protocol specification (Release 15)," 3GPP TS 38.321 V15.7.0 (Sep. 2019).

Third Generation Partnership Project, "Technical Specification Group Radio Access Network; NR; Radio Resource Control (RRC) protocol specification (Release 15)," 3GPP TS 38.331 V15.3.0 (Sep. 2018).

Third Generation Partnership Project, "Technical Specification Group Radio Access Network; NR; Radio Resource Control (RRC) protocol specification (Release 15)," 3GPP TS 38.331 V15.7.0 (Sep. 2019).

* cited by examiner

| First information | Time length set#1(ms) | Time length set#2(ms) |
|---|---|---|
| 0 | 5 | 5 |
| 1 | 10 | 10 |
| 2 | 20 | 20 |
| 3 | 30 | 30 |
| 4 | 40 | 40 |
| 5 | 60 | 50 |
| 6 | 80 | 60 |
| 7 | 120 | 80 |
| 8 | 160 | 120 |
| 9 | 240 | 160 |
| 10 | 320 | 200 |
| 11 | 480 | 240 |
| 12 | 960 | 320 |
| 13 | 1920 | 480 |
| 14 | Reserved | Reserved |
| 15 | Reserved | Reserved |

| First information | Time length set#1(ms) | Time length set#2(ms) |
|---|---|---|
| 0 | 5 | 2 |
| 1 | 10 | 4 |
| 2 | 20 | 8 |
| 3 | 30 | 12 |
| 4 | 40 | 16 |
| 5 | 60 | 24 |
| 6 | 80 | 32 |
| 7 | 120 | 48 |
| 8 | 160 | 64 |
| 9 | 240 | 96 |
| 10 | 320 | 128 |
| 11 | 480 | 192 |
| 12 | 960 | 384 |
| 13 | 1920 | 768 |
| 14 | Reserved | Reserved |
| 15 | Reserved | Reserved |

| First information | Time length set#1(ms) | Second information | Time length set#2(ms) |
|---|---|---|---|
| 0 | 5 | 0 | 5 |
| 1 | 10 | 1 | 10 |
| 2 | 20 | 2 | 20 |
| 3 | 30 | 3 | 30 |
| 4 | 40 | 4 | 40 |
| 5 | 60 | 5 | 50 |
| 6 | 80 | 6 | 60 |
| 7 | 120 | 7 | 80 |
| 8 | 160 | 8 | 120 |
| 9 | 240 | 9 | 160 |
| 10 | 320 | 10 | 200 |
| 11 | 480 | 11 | 240 |
| 12 | 960 | 12 | 320 |
| 13 | 1920 | 13 | 480 |
| 14 | Reserved | 14 | Reserved |
| 15 | Reserved | 15 | Reserved |

FIG. 11

METHOD AND DEVICE FOR USE IN COMMUNICATION NODE FOR WIRELESS COMMUNICATION

CROSS REFERENCE TO RELATED APPLICATIONS

This application is a continuation of International Application No. PCT/CN2019/129268, filed Dec. 27, 2019, claims the priority benefit of Chinese Patent Application No. 201910027128.X, filed on Jan. 11, 2019, the full disclosure of which is incorporated herein by reference.

BACKGROUND

Technical Field

The present disclosure relates to transmission methods and devices in wireless communication systems, and in particular to a transmission scheme and device related to random access.

Related Art

Application scenarios of future wireless communication systems are becoming increasingly diversified, and different application scenarios have different performance demands on systems. In order to meet different performance requirements of various application scenarios, it was decided at the 3rd Generation Partner Project (3GPP) Radio Access Network (RAN) #72th plenary that that a study on New Radio (NR), or what is called Fifth Generation (5G) shall be conducted. The work item of NR was approved at the 3GPP RAN #75th plenary to standardize NR.

To adapt to a variety of application scenarios and meet different requirements, a study item (SI) of NR Non-orthogonal Multiple Access (NoMA) was also approved at the 3GPP RAN #76th plenary. The SI was started from Release 16 and soon after its completion a WI was initiated to standardize relevant techniques. Following the NoMA SI, the WI of 2-step Random Access (2-step RACH) under NR was approved at the 3GPP RAN #82 plenary.

SUMMARY

For User Equipment (UE) in R16 and in subsequent versions, both 2-Step RACH and conventional 4-Step RACH procedure can be adopted. And according to the requirements of WI of the 2-Step RACH, the UE can switch between the 2-Step RACH and the 4-Step RACH or fallback from the 2-Step RACH to the 4-Step RACH. Since the application scenarios of the 2-Step RACH and the 4-Step RACH are different, the performance requirements of the 2-Step RACH and the 4-Step RACH may be different, including requirements of different time delays, different collision probabilities, different capacities and etc.

The present disclosure provides a solution for different requirements of the 2-Step RACH and the 4-Step RACH. It should be noted that the embodiments of a base station and the characteristics of the embodiments in the present disclosure may be applied to a UE if no conflict is incurred, and vice versa. Further, the embodiments and the characteristics of the embodiments in the present disclosure may be mutually combined if no conflict is incurred.

The present disclosure provides a method in a first communication node for wireless communications, comprising:
transmitting a first sequence;
receiving first information, the first information being used to determine X candidate time lengths, X being a positive integer greater than 1; and
transmitting a second sequence and determining whether to transmit a second radio signal;
herein, a length of a time interval between a time for transmitting the first sequence and a time for transmitting the second sequence is not less than a target time length; a first time length is equal to one of the X candidate time lengths, and the target time length is not greater than the first time length; when the first time length is greater than 0, the first communication node randomly selects the target time length between 0 and the first time length; when the first time length is equal to 0, the target time length is equal to 0; whether the second radio signal is transmitted is used to determine the first time length out of the X candidate time lengths.

In one embodiment, the present disclosure determines the first time length according to whether the second radio signal is transmitted, which realizes the design of adopting different random access fallbacks for the 2-Step RACH and the 4-Step RACH, so as to meet the different performance requirements of the 2-Step RACH and the 4-Step RACH.

In one embodiment, the first information is used to determine that X candidate time lengths obtain different random access backoff time for the 2-Step RACH and the 4-Step RACH through a random access feedback (RAR or MsgB), so as to support a smooth handover between the 2-Step RACH and the 4-Step RACH.

According to one aspect of the present disclosure, the above method is characterized in also transmitting a first radio signal, the first sequence is used to indicate at least one of time-frequency resources occupied by the first radio signal, a Modulation and Coding Scheme (MCS) adopted by the first radio signal or a Redundancy Version (RV) adopted by the first radio signal.

According to one aspect of the present disclosure, the above method is characterized in that the X candidate time lengths respectively belong to X time length sets, and the first information is used to respectively determine the X candidate time lengths in the X time length sets; any of the X time length sets comprises more than one candidate time length.

According to one aspect of the present disclosure, the above method is characterized in radio resources occupied by the second sequence belong to a first radio resource block, the first radio resource block belongs to a first radio resource group, and the first radio resource group is one of Y radio resource groups, Y being a positive integer greater than 1; whether the second radio signal is transmitted is used to determine the first radio resource group out of the Y radio resource groups.

In one embodiment, different PRACH resources are adopted for the 2-Step RACH and the 4-Step RACH, so as to achieve independent control over indicators, such as collision, capacity and time delay of the 2-Step RACH and the 4-Step RACH, thereby satisfying different scenario requirements.

According to one aspect of the present disclosure, the above method is characterized in also transmitting a second radio signal; the second sequence is used to indicate at least one of time-frequency resources occupied by the second radio signal, a MCS adopted by the second radio signal or an RV adopted by the second radio signal.

According to one aspect of the present disclosure, the above method is characterized in that a second time length is equal to a candidate time length other than the first time length in the X candidate time lengths, and the first time length is equal to a product of the second time length and a first factor; the first factor is fixed, or the first factor is configured.

In one embodiment, by introducing the first factor, the scaling between a backoff value of the 2-Step RACH and a backoff value of 4-Step RACH is achieved, so that the fallback range can be flexibly controlled according to capacity requirements, congestion conditions and other aspects, thus optimizing system performance.

According to one aspect of the present disclosure, the above method is characterized in also receiving second information, the first information and the second information are respectively used to determine the X candidate time lengths, X being equal to 2.

The present disclosure provides a method in a second communication node for wireless communications, comprising:

receiving a first sequence;

transmitting first information, the first information being used to determine X candidate time lengths, X being a positive integer greater than 1; and receiving a second sequence and determining whether a second radio signal is transmitted;

herein, a length of a time interval between a time for transmitting the first sequence and a time for transmitting the second sequence is not less than a target time length; a first time length is equal to one of the X candidate time lengths, and the target time length is not greater than the first time length; when the first time length is greater than 0, a transmitter of the first sequence randomly selects the target time length between 0 and the first time length; when the first time length is equal to 0, the target time length is equal to 0; whether the second radio signal is transmitted is used to determine the first time length out of the X candidate time lengths.

According to one aspect of the present disclosure, the above method is characterized in also receiving a first radio signal, the first sequence is used to indicate at least one of time-frequency resources occupied by the first radio signal, a MCS adopted by the first radio signal or an RV adopted by the first radio signal.

According to one aspect of the present disclosure, the above method is characterized in that the X candidate time lengths respectively belong to X time length sets, and the first information is used to respectively determine the X candidate time lengths in the X time length sets; any of the X time length sets comprises more than one candidate time length.

According to one aspect of the present disclosure, the above method is characterized in radio resources occupied by the second sequence belong to a first radio resource block, the first radio resource block belongs to a first radio resource group, and the first radio resource group is one of Y radio resource groups, Y being a positive integer greater than 1; whether the second radio signal is transmitted is used to determine the first radio resource group out of the Y radio resource groups.

According to one aspect of the present disclosure, the above method is characterized in also receiving a second radio signal; the second sequence is used to indicate at least one of time-frequency resources occupied by the second radio signal, a MCS adopted by the second radio signal or an RV adopted by the second radio signal.

According to one aspect of the present disclosure, the above method is characterized in that a second time length is equal to a candidate time length other than the first time length in the X candidate time lengths, and the first time length is equal to a product of the second time length and a first factor; the first factor is fixed, or the first factor is configured.

According to one aspect of the present disclosure, the above method is characterized in also transmitting second information, the first information and the second information are respectively used to determine the X candidate time lengths, X being equal to 2.

The present disclosure provides a first communication node for wireless communications, comprising:

a first transmitter, transmitting a first sequence;

a first receiver, receiving first information, the first information being used to determine X candidate time lengths, X being a positive integer greater than 1; and a second transmitter, transmitting a second sequence and determining whether to transmit a second radio signal;

herein, a length of a time interval between a time for transmitting the first sequence and a time for transmitting the second sequence is not less than a target time length; a first time length is equal to one of the X candidate time lengths, and the target time length is not greater than the first time length; when the first time length is greater than 0, the first communication node randomly selects the target time length between 0 and the first time length; when the first time length is equal to 0, the target time length is equal to 0; whether the second radio signal is transmitted is used to determine the first time length out of the X candidate time lengths.

The present disclosure provides a second communication node for wireless communications, comprising:

a second receiver, receiving a first sequence;

a third transmitter, transmitting first information, the first information being used to determine X candidate time lengths, X being a positive integer greater than 1; and a third receiver, receiving a second sequence and determining whether a second radio signal is transmitted;

herein, a length of a time interval between a time for transmitting the first sequence and a time for transmitting the second sequence is not less than a target time length; a first time length is equal to one of the X candidate time lengths, and the target time length is not greater than the first time length; when the first time length is greater than 0, a transmitter of the first sequence randomly selects the target time length between 0 and the first time length; when the first time length is equal to 0, the target time length is equal to 0; whether the second radio signal is transmitted is used to determine the first time length out of the X candidate time lengths.

In one embodiment, the present disclosure has the following technical advantages:

by adopting methods in the present disclosure, the design of adopting different random access fallbacks for the 2-Step RACH and the 4-Step RACH is realized, so as to meet the different performance requirements of the 2-Step RACH and the 4-Step RACH.

by adopting methods in the present disclosure, different random access backoff time for the 2-Step RACH and the 4-Step RACH through a random access feedback (RAR or MsgB) is obtained, so as to support a smooth handover of the 2-Step RACH and the 4-Step RACH.

by adopting methods in the present disclosure, the scaling between a backoff value of the 2-Step RACH and a backoff value of 4-Step RACH is achieved, so that the fallback range can be flexibly controlled according to capacity requirements, congestion conditions and other aspects, thus optimizing system performance.

the method in the present disclosure adopts different PRACH resources for the 2-Step RACH and the 4-Step RACH, so as to achieve independent control over indicators, such as the collision, capacity and time delay of the 2-Step RACH and the 4-Step RACH, thereby satisfying different scenario requirements.

BRIEF DESCRIPTION OF THE DRAWINGS

Other features, objects and advantages of the present disclosure will become more apparent from the detailed description of non-restrictive embodiments taken in conjunction with the following drawings:

FIG. 11 illustrates a schematic diagram of a relation between first information and second information according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
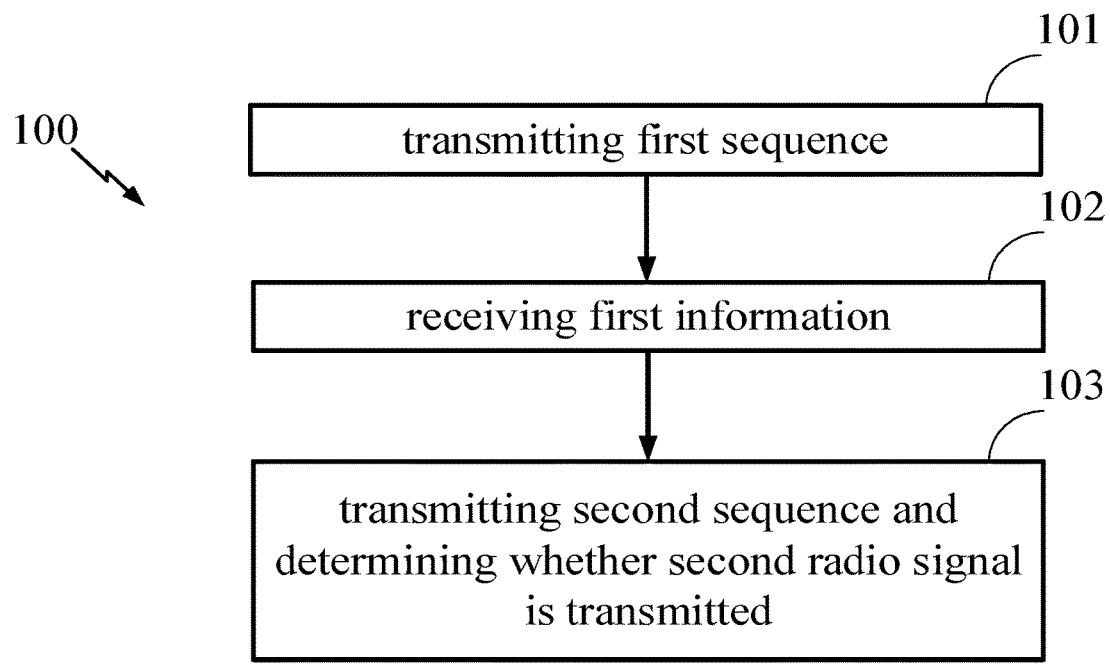
FIG. 1 illustrates a flowchart of a first sequence, first information and a second sequence according to one embodiment of the present disclosure.

Embodiment 1 illustrates a flowchart of a first sequence, first information and a second sequence according to one embodiment of the present disclosure, as shown in FIG. 1. In 100 illustrated in FIG. 1, each box represents a step, particularly, the sequential order of steps in these boxes does not necessarily mean that the steps are chronologically arranged.

In Embodiment 1, the first communication node in the present disclosure transmits a first sequence in step 101; receives first information in step 102, the first information being used to determine X candidate time lengths, X being a positive integer greater than 1; and transmits a second sequence and determines whether to transmit a second radio signal in step 103; herein, a length of a time interval between a time for transmitting the first sequence and a time for transmitting the second sequence is not less than a target time length; a first time length is equal to one of the X candidate time lengths, and the target time length is not greater than the first time length; when the first time length is greater than 0, the first communication node randomly selects the target time length between 0 and the first time length; when the first time length is equal to 0, the target time length is equal to 0; whether the second radio signal is transmitted is used to determine the first time length out of the X candidate time lengths.

In one embodiment, the first communication node is in an RRC_IDLE state.

In one embodiment, the first communication node is in an RRC_CONNECTED state.

In one embodiment, the first communication node is in an RRC_INACTIVE state.

In one embodiment, the first sequence is a preamble.

In one embodiment, the first sequence is a pseudo-random sequence.

In one embodiment, the first sequence is a Zadoff-Chu (ZC) sequence.

In one embodiment, the first sequence comprises all of elements of a ZC sequence.

In one embodiment, the first sequence only comprises part of elements of a ZC sequence.

In one embodiment, the first sequence is a ZC sequence with a length of 839.

In one embodiment, the first sequence is a ZC sequence with a length of 139.

In one embodiment, all of elements in the first sequence are the same.

In one embodiment, there exist two elements in the first sequence being different.

In one embodiment, all of elements in the first sequence are 1.

In one embodiment, the first sequence comprises a Cyclic Prefix (CP).

In one embodiment, the first sequence is transmitted on a Physical Random Access Channel (PRACH).

In one embodiment, the first sequence is a preamble in a 2-Step RACH.

In one embodiment, the first sequence is a preamble in a 4-Step RACH.

In one embodiment, the first sequence is a preamble in MsgA in a 2-Step RACH.

In one embodiment, the first information is transmitted through a higher-layer signaling.

In one embodiment, the first information is transmitted through a physical-layer signaling.

In one embodiment, the first information comprises all or part of a higher-layer signaling.

In one embodiment, the first information comprises all or part of a physical-layer signaling.

In one embodiment, the first information comprises all or partial Information Elements (IE) in a Radio Resource Control (RRC) signaling.

In one embodiment, the first information comprises all or partial fields in an IE in a RRC signaling.

In one embodiment, the first information comprises all or partial fields in a Medium Access Control (MAC) layer signaling.

In one embodiment, the first information comprises all or part of a MAC Control Element (CE).

In one embodiment, the first information comprises all or part of a MAC Header.

In one embodiment, the first information comprises all or part of a MAC payload in a Random Access Response (RAR).

In one embodiment, the first information comprises all or part of a MAC Protocol Data Unit (PDU) in an RAR.

In one embodiment, the first information comprises all or part of a subheader in an RAR.

In one embodiment, the first information comprises all or part of a MAC CE in an RAR.

In one embodiment, the first information comprises all or part of a Msg4.

In one embodiment, the first information comprises all or part of a Msg4 in a 4-Step RACH.

In one embodiment, the first information comprises all or part of a MsgB in a 2-Step RACH.

In one embodiment, the first information comprises all or part of a MAC payload in a MsgB in a 2-Step RACH.

In one embodiment, the first information comprises all or part of a MAC PDU in a MsgB in a 2-Step RACH.

In one embodiment, the first information comprises all or part of a MAC Service Data Unit (SDU) in a MsgB in a 2-Step RACH.

In one embodiment, the first information comprises all or part of a subheader in a MsgB in a 2-Step RACH.

In one embodiment, the first information comprises all or part of a MAC CE in a MsgB in a 2-Step RACH.

In one embodiment, the first information is transmitted through a Downlink Shared Channel (DL-SCH).

In one embodiment, the first information is transmitted through a Physical Downlink Shared Channel (PDSCH).

In one embodiment, the first information is transmitted through a PDSCH, and a Random Access Radio Network Temporary Identity (RA-RNTI) is used to generate an initial value of a generator of a scrambling sequence of a PDSCH carrying the first information.

In one embodiment, the first information is transmitted through a PDSCH, and a Temporary Cell Radio Network Temporary Identity (TC-RNTI) is used to generate an initial value of a generator of a scrambling sequence of a PDSCH carrying the first information.

In one embodiment, the first information is transmitted through a PDSCH, and an identity other than an RA-RNTI and a TC-RNTI is used to generate an initial value of a generator of a scrambling sequence of a PDSCH carrying the first information.

In one embodiment, the first information is transmitted through a PDSCH, and a MsgB-RNTI is used to generate an initial value of a generator of a scrambling sequence of a PDSCH carrying the first information.

In one embodiment, the first information is broadcast.
In one embodiment, the first information is unicast.
In one embodiment, the first information is Cell-Specific.
In one embodiment, the first information is UE-specific.
In one embodiment, the first information is UE group-specific.

In one embodiment, the first information is transmitted through a Physical Downlink Control Channel (PDCCH).

In one embodiment, the first information comprises all or partial fields of a Downlink Control Information (DCI) signaling.

In one embodiment, the above phrase of "the first information being used to determine X candidate time lengths" includes: the first information is used by the first communication node to determine the X candidate time lengths.

In one embodiment, the above phrase of "the first information being used to determine X candidate time lengths" includes: the first information is used to directly indicate the X candidate time lengths.

In one embodiment, the above phrase of "the first information being used to determine X candidate time lengths" includes: the first information is used to indirectly indicate the X candidate time lengths.

In one embodiment, the above phrase of "the first information being used to determine X candidate time lengths" includes: the first information is used to explicitly indicate the X candidate time lengths.

In one embodiment, the above phrase of "the first information being used to determine X candidate time lengths" includes: the first information is used to implicitly indicate the X candidate time lengths.

In one embodiment, the above phrase of "the first information being used to determine X candidate time lengths" includes: the first information is used to determine one of the X candidate time lengths.

In one embodiment, the above phrase of "the first information being used to determine X candidate time lengths" includes: the first information is used to determine partial candidate time lengths among the X candidate time lengths.

In one embodiment, the above phrase of "the first information being used to determine X candidate time lengths" includes: the first information is used to determine all candidate time lengths among the X candidate time lengths.

In one embodiment, the X is equal to 2.
In one embodiment, the X is greater than 2.
In one embodiment, the second sequence is a preamble.
In one embodiment, the second sequence is a pseudo-random sequence.

In one embodiment, the second sequence is a Zadoff-Chu (ZC) sequence.

In one embodiment, the second sequence comprises all of elements of a ZC sequence.

In one embodiment, the second sequence only comprises part of elements of a ZC sequence.

In one embodiment, the second sequence is a ZC sequence with a length of 839.

In one embodiment, the second sequence is a ZC sequence with a length of 139.

In one embodiment, all of elements in the second sequence are the same.

In one embodiment, there exist two elements in the second sequence being different.

In one embodiment, all of elements in the second sequence are 1.

In one embodiment, the second sequence comprises a Cyclic Prefix (CP).

In one embodiment, the second sequence is transmitted through a Physical Random Access Channel (PRACH).

In one embodiment, the first sequence is the same as the second sequence.

In one embodiment, the first sequence is different from the second sequence.

In one embodiment, transmit power of the first sequence is the same as transmit power of the second sequence.

In one embodiment, transmit power of the first sequence is different from transmit power of the second sequence.

In one embodiment, transmit power of the second sequence is greater than transmit power of the first sequence.

In one embodiment, the second sequence is a preamble sequence in re-initiating a RACH.

In one embodiment, the first sequence is a preamble sequence in a first initiated RA.

In one embodiment, the first sequence is a preamble sequence in re-initiating a RACH.

In one embodiment, an RA procedure using the first sequence as a preamble sequence was not successful.

In one embodiment, an RA procedure using the first sequence as a preamble sequence was not completed.

In one embodiment, the first node determines whether to transmit the second radio signal based on performance requirements of a RACH.

In one embodiment, the first node determines whether to transmit the second radio signal based on time delay requirements of a RACH.

In one embodiment, the first communication node determines whether to transmit the second radio signal based on indication from a high layer.

In one embodiment, the first communication node determines whether to transmit the second radio signal based on an indication from a high layer inside the first communication node.

In one embodiment, the first communication node determines whether to transmit the second radio signal based on service requirement.

In one embodiment, the first communication node determines whether to transmit the second radio signal based on service type.

In one embodiment, the first communication node determines whether to transmit the second radio signal by itself.

In one embodiment, the first communication node determines whether to transmit the second radio signal randomly.

In one embodiment, the above phrase of "determining whether to transmit a second radio signal" includes determining whether to initiate a 2-Step RACH.

In one embodiment, the above phrase of "determining whether to transmit a second radio signal" includes determining whether to initiate a RACH other than 4-Step RACH.

In one embodiment, the above phrase of "determining whether to transmit a second radio signal" includes determining whether to initiate a 2-Step RACH or a 4-Step RACH.

In one embodiment, the above phrase of "determining whether to transmit a second radio signal" includes determining whether to initiate a 2-Step RACH defined in 3GPP Release 16 (R16) or a 4-Step RACH defined in 3GPP R15.

In one embodiment, the above phrase of "determining whether to transmit a second radio signal" includes determining whether to initiate a 2-Step RACH not backward compatible with 3GPP R15 or a 4-Step RACH compatible with 3GPP R15.

In one embodiment, the above phrase of "determining whether to transmit a second radio signal" includes determining whether to transmit a MsgA or only the second sequence.

In one embodiment, the above phrase of "determining whether to transmit a second radio signal" includes determining whether to transmit a MsgA or only the second sequence in a RACH procedure.

In one embodiment, the above phrase of "determining whether to transmit a second radio signal" includes determining whether to transmit a MsgA or only the second sequence before receiving a RAR from the network side.

In one embodiment, the second radio signal is transmitted through an Uplink Shared Channel (UL-SCH).

In one embodiment, the second radio signal is transmitted through a Physical Uplink Shared Channel (PUSCH).

In one embodiment, the second radio signal is obtained after a TB is sequentially subjected to CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation, and Modulation and Upconversion.

In one embodiment, the second radio signal is obtained after a TB is sequentially subjected to CRC Insertion, Segmentation, coding block-level CRC Insertion, Channel Coding, Rate Matching, Concatenation, Scrambling, Modulation, Layer Mapping, Precoding, Mapping to Virtual Resource Blocks, Mapping from Virtual to Physical Resource Blocks, OFDM Baseband Signal Generation, and Modulation and Upconversion.

In one embodiment, the second radio signal is obtained after a TB is sequentially subjected to CRC Insertion, Channel Coding, Rate Matching, Scrambling, Modulation, Layer Mapping, Transform Precoding, Precoding, Mapping to Virtual Resource Blocks, Mapping from Virtual to Physical Resource Blocks, OFDM Baseband Signal Generation, and Modulation and Upconversion.

In one embodiment, the second radio signal is obtained after a TB is sequentially subjected to CRC Insertion, Segmentation, coding block-level CRC Insertion, Channel Coding, Rate Matching, Concatenation, Scrambling, Modulation, Layer Mapping, Transform Precoding, Precoding, Mapping to Virtual Resource Blocks, Mapping from Virtual to Physical Resource Blocks, OFDM Baseband Signal Generation, and Modulation and Upconversion.

In one embodiment, the second radio signal comprises a Physical Uplink Shared Channel (PUSCH) and a Demodulation Reference Signal (DMRS).

In one embodiment, the second radio signal only comprises a Physical Uplink Shared Channel (PUSCH).

In one embodiment, a time for transmitting the first sequence refers to a start time for transmitting the first sequence.

In one embodiment, a time for transmitting the first sequence refers to an end time for transmitting the first sequence.

In one embodiment, a time for transmitting the first sequence refers to a start time of a slot to which time-domain resources occupied by the first sequence belongs.

In one embodiment, a time for transmitting the first sequence refers to an end time of a slot to which time-domain resources occupied by the first sequence belongs.

In one embodiment, a time for transmitting the first sequence refers to a start time of a subframe to which time-domain resources occupied by the first sequence belongs.

In one embodiment, a time for transmitting the first sequence refers to an end time of a subframe to which time-domain resources occupied by the first sequence belongs.

In one embodiment, a time for transmitting the second sequence refers to a start time for transmitting the second sequence.

In one embodiment, a time for transmitting the second sequence refers to an end time for transmitting the second sequence.

In one embodiment, a time for transmitting the second sequence refers to a start time of a slot to which time-domain resources occupied by the second sequence belong.

In one embodiment, a time for transmitting the second sequence refers to an end time of a slot to which time-domain resources occupied by the second sequence belong.

In one embodiment, a time for transmitting the second sequence refers to a start time of a subframe to which time-domain resources occupied by the second sequence belong.

In one embodiment, a time for transmitting the second sequence refers to an end time of a subframe to which time-domain resources occupied by the second sequence belong.

In one embodiment, the above phrase that "a length of a time interval between a time for transmitting the first sequence and a time for transmitting the second sequence is not less than a target time length" includes: a length of a time interval between a start time for transmitting the first sequence and a start time for transmitting the second sequence is not less than the target time length.

In one embodiment, the above phrase that "a length of a time interval between a time for transmitting the first sequence and a time for transmitting the second sequence is not less than a target time length" includes: a length of a time interval between an end time for transmitting the first sequence and a start time for transmitting the second sequence is not less than the target time length.

In one embodiment, the above phrase that "a length of a time interval between a time for transmitting the first sequence and a time for transmitting the second sequence is not less than a target time length" includes: a length of a time interval between an end time for transmitting the first sequence and an end time for transmitting the second sequence is not less than the target time length.

In one embodiment, the above phrase that "a length of a time interval between a time for transmitting the first sequence and a time for transmitting the second sequence is not less than a target time length" includes: a length of a time interval between a time when an RA procedure with the first sequence as a preamble sequence is determined as not completed and a time for initiating an RA procedure with the second sequence as a preamble sequence is not less than the target time length.

In one embodiment, the above phrase that "a length of a time interval between a time for transmitting the first sequence and a time for transmitting the second sequence is not less than a target time length" includes: a length of a time interval between a time when an RA procedure with the first sequence as a preamble sequence is determined as not completed and a start time for initiating an RA resource selection in an RA procedure with the second sequence as a preamble sequence is not less than the target time length.

In one embodiment, the above phrase that "a length of a time interval between a time for transmitting the first sequence and a time for transmitting the second sequence is not less than a target time length" includes: a length of a time interval between a start time for initiating an RA resource selection in an RA procedure with the first sequence as a preamble sequence and a start time for initiating an RA resource selection in an RA procedure with the second sequence as a preamble sequence is not less than the target time length.

the above phrase that "a length of a time interval between a time for transmitting the first sequence and a time for transmitting the second sequence is not less than a target time length" includes: a length of a time interval between an end time for initiating an RA resource selection in an RA procedure with the first sequence as a preamble sequence and a start time for initiating an RA resource selection in an RA procedure with the second sequence as a preamble sequence is not less than the target time length.

In one embodiment, the above phrase that "a length of a time interval between a time for transmitting the first sequence and a time for transmitting the second sequence is not less than a target time length" includes: a length of a time interval between an end time for receiving the first information and a start time for transmitting the second sequence is not less than the target time length.

In one embodiment, a length of a time interval between an end time for receiving the first information and a start time for transmitting the second sequence is not less than the target time length.

In one embodiment, an end time for transmitting the first sequence is not later than a start time for receiving the first information.

In one embodiment, the target time length is equal to a backoff time.

In one embodiment, the target time length is equal to a random backoff time.

In one embodiment, the target time length is equal to a backoff time between two RAs.

In one embodiment, the target time length is equal to "random backoff time" in 3GPP TS38.321 (v15.3.0), section 5.1.4.

In one embodiment, the target time length is greater than 0 ms.

In one embodiment, the target time length is equal to 0 ms.

In one embodiment, the target time length is less than or equal to the first time length.

In one embodiment, the target time length is measured by ms.

In one embodiment, the target time length is expressed in terms of a number of slots.

In one embodiment, the target time length is expressed in terms of a number of multicarrier symbols.

In one embodiment, the target time length is expressed in terms of a number of subframes.

In one embodiment, the target time length is greater than or equal to 0 ms.

In one embodiment, the target time length belongs to an interval of [0, the first time length].

In one embodiment, the target time length is equal to a value between 0 and the first time length.

In one embodiment, the first time length is measured by ms.

In one embodiment, the first time length is expressed in terms of a number of slots.

In one embodiment, the first time length is expressed in terms of a number of multicarrier symbols.

In one embodiment, the first time length is expressed in terms of a number of subframes.

In one embodiment, the first time length is "PREAMBLE_BACKOFF" in 3GPP TS38.321 (v15.3.0), section 5.1.

In one embodiment, the first time length is equal to an upper limit of a backoff time.

In one embodiment, the first time length is equal to a possible maximum value of a random backoff time.

In one embodiment, the above phrase of "the first communication node randomly selecting the target time length between 0 and the first time length" includes: the first communication node randomly selects the target time length according to a given probability distribution between 0 and the first time length.

In one embodiment, the above phrase of "the first communication node randomly selecting the target time length between 0 and the first time length" includes: the first communication node randomly selects the target time length with an intermediate probability between 0 and the first time length.

In one embodiment, the above phrase of "the first communication node randomly selecting the target time length between 0 and the first time length" includes: the first communication node randomly selects the target time length according to a uniform distribution between 0 and the first time length.

In one embodiment, any of the X candidate time lengths is measured by ms.

In one embodiment, any of the X candidate time lengths is expressed in terms of a number of slots.

In one embodiment, any of the X candidate time lengths is expressed in terms of a number of subframes.

In one embodiment, any of the X candidate time lengths is expressed in terms of a number of multicarrier symbols.

In one embodiment, there exist two of the X candidate time lengths being the same.

In one embodiment, any two of the X candidate time lengths being different.

In one embodiment, any of the X candidate time lengths is not less than 0.

In one embodiment, there exists one of the X candidate time lengths being equal to 0.

In one embodiment, any of the X candidate time lengths is greater than 0.

In one embodiment, the above phrase that "whether the second radio signal is transmitted is used to determine the first time length out of the X candidate time lengths" includes: whether the first communication node initiates a 2-Step RACH or a 4-Step RACH is used to determine the first time length out of the X candidate time lengths.

In one embodiment, the above phrase that "whether the second radio signal is transmitted is used to determine the first time length out of the X candidate time lengths" includes: whether the second radio signal is transmitted is used by the first communication node to determine the first time length out of the X candidate time lengths.

In one embodiment, the above phrase that "whether the second radio signal is transmitted is used to determine the first time length out of the X candidate time lengths" includes: whether the second radio signal is transmitted is directly used to determine the first time length out of the X candidate time lengths.

In one embodiment, the above phrase that "whether the second radio signal is transmitted is used to determine the first time length out of the X candidate time lengths" includes: whether the second radio signal is transmitted is indirectly used to determine the first time length out of the X candidate time lengths.

In one embodiment, the above phrase that "whether the second radio signal is transmitted is used to determine the first time length out of the X candidate time lengths" includes: only whether the second radio signal is transmitted is used to determine the first time length out of the X candidate time lengths.

In one embodiment, the above phrase that "whether the second radio signal is transmitted is used to determine the first time length out of the X candidate time lengths" includes: whether the second radio signal is transmitted and other factors are used together to determine the first time length out of the X candidate time lengths.

In one embodiment, the above phrase that "whether the second radio signal is transmitted is used to determine the first time length out of the X candidate time lengths" includes: the X is equal to 2, when the second radio signal is transmitted, the first time length is equal to one of the X candidate time lengths, otherwise the first time length is equal to another one of the X candidate time lengths.

In one embodiment, the above phrase that "whether the second radio signal is transmitted is used to determine the first time length out of the X candidate time lengths" includes: the X is equal to 2, when the first communication node initiates a 2-Step RACH, the first time length is equal to one of the X candidate time lengths; when the first communication node initiates a 4-Step RACH, the first time length is equal to another one of the X candidate time lengths.

In one embodiment, the above phrase that "whether the second radio signal is transmitted is used to determine the first time length out of the X candidate time lengths" includes: whether the second radio signal is transmitted and a state of the first communication node (RRC_IDLE, RRC_CONNECTED or RRC_INACTIVE) are used together to determine the first time length out of the X candidate time lengths.

In one embodiment, the above phrase that "whether the second radio signal is transmitted is used to determine the first time length out of the X candidate time lengths" includes: whether the second radio signal is transmitted and a trigger reason for transmitting the second sequence (Beam Failure Recovery, Handover or other) are used together to determine the first time length out of the X candidate time lengths.

In one embodiment, the above phrase that "whether the second radio signal is transmitted is used to determine the first time length out of the X candidate time lengths" includes: whether the second radio signal is transmitted and transmitting the second sequence are used together to determine the first time length out of the X candidate time lengths.

In one embodiment, the first sequence, the first information and the second sequence are all transmitted via an air interface.

In one embodiment, the first sequence, the first information and the second sequence are all transmitted via a radio interface.

In one embodiment, the first sequence, the first information and the second sequence are all transmitted through a radio channel.

In one embodiment, the first sequence, the first information and the second sequence are all transmitted via a Uu interface.

In one embodiment, the first sequence, the first information and the second sequence are all transmitted via an interface between the second communication node and the first communication node.

Embodiment 2

Figure 2:
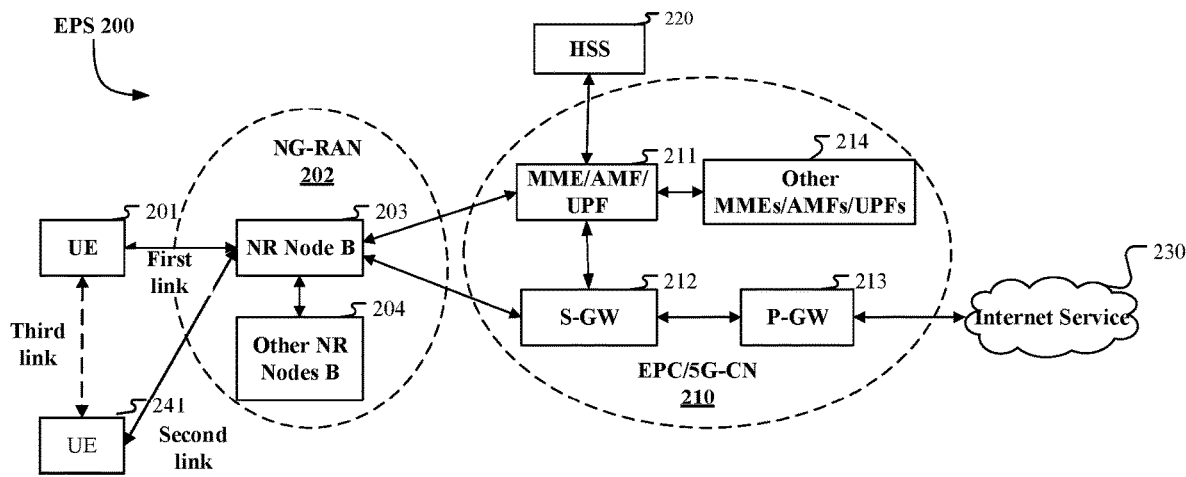
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. In NTN network, the gNB 203 may be a satellite, an aircraft or a territorial base station relayed through a satellite. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrowband physical network devices, machine-type communication devices, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Services.

In one embodiment, the UE 201 corresponds to the first communication node in the present disclosure.

In one embodiment, the UE 201 supports a 2-Step RACH.

In one embodiment, the gNB203 corresponds to the second communication node in the present disclosure.

In one embodiment, the gNB203 supports a 2-Step RACH.

Embodiment 3

Figure 3:
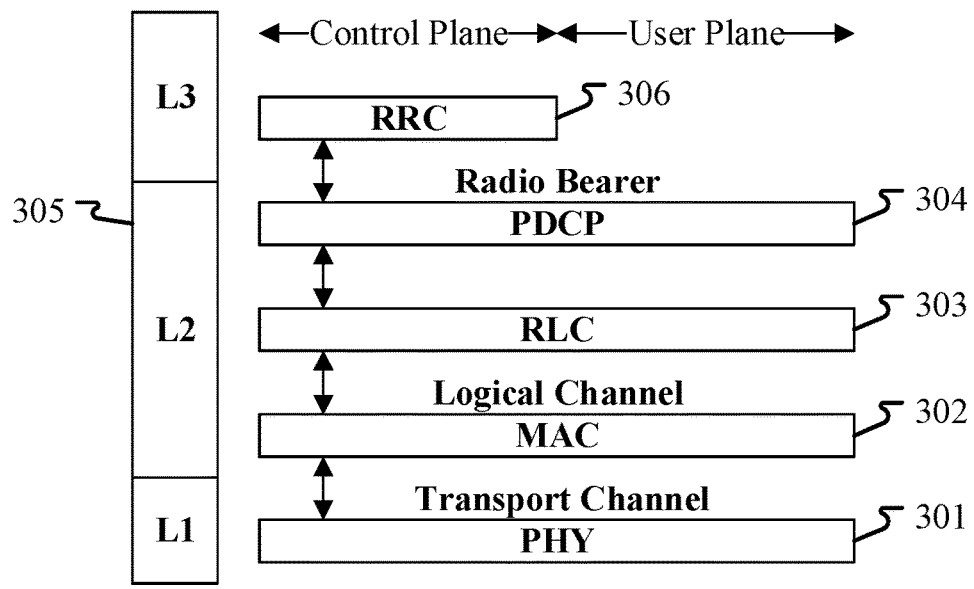
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane and a control plane. In FIG. 3, the radio protocol architecture for a first communication node (UE) and a second communication node (gNB, eNB or a relay) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first communication node and the second communication node via the PHY 301. In the user plane, L2 305 comprises a MAC sublayer 302, a Radio Link Control (RLC) sublayer 303 and a Packet Data Convergence Protocol (PDCP) sublayer 304. All the three sublayers terminate at the second communication node of the network side. Although not described in FIG. 3, the first communication node may comprise several higher layers above the L2 305, such as a network layer (e.g., IP layer) terminated at a P-GW of the network side and an application layer terminated at the other side of the connection (e.g., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead, provides security by encrypting a packet, and provides support for first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane, the radio protocol architecture of the first communication node and the second communication node is almost the same as the radio protocol architecture on the PHY 301 and the L2 305, but there is no header compression for the control plane. The control plane also comprises an RRC sublayer 306 in the layer 3 (L3). The RRC sublayer 306 is responsible for obtaining radio resources (i.e., radio bearer) and configuring the lower layer using an RRC signaling between the second communication node and the first communication node.

In one embodiment, the radio protocol architecture in FIG. 3 is applicable to the first communication node in the present disclosure.

In one embodiment, the radio protocol architecture in FIG. 3 is applicable to the second communication node in the present disclosure.

In one embodiment, the first sequence in the present disclosure is generated by the RRC 306.

In one embodiment, the first sequence in the present disclosure is generated by the MAC 302.

In one embodiment, the first sequence in the present disclosure is generated by the PHY 301.

In one embodiment, the first information in the present disclosure is generated by the RRC 306.

In one embodiment, the first information in the present disclosure is generated by the MAC 302.

In one embodiment, the first information in the present disclosure is generated by the PHY 301.

In one embodiment, the second sequence in the present disclosure is generated by the RRC 306.

In one embodiment, the second sequence in the present disclosure is generated by the MAC 302.

In one embodiment, the second sequence in the present disclosure is generated by the PHY 301.

In one embodiment, the first radio signal in the present disclosure is generated by the RRC 306.

In one embodiment, the first radio signal in the present disclosure is generated by the MAC 302.

In one embodiment, the first radio signal in the present disclosure is generated by the PHY 301.

In one embodiment, the second radio signal in the present disclosure is generated by the RRC 306.

In one embodiment, the second radio signal in the present disclosure is generated by the MAC 302.

In one embodiment, the second radio signal in the present disclosure is generated by the PHY 301.

In one embodiment, the second information in the present disclosure is generated by the RRC 306.

In one embodiment, the second information in the present disclosure is generated by the MAC 302.

In one embodiment, the second information in the present disclosure is generated by the PHY 301.

Embodiment 4

Figure 4:
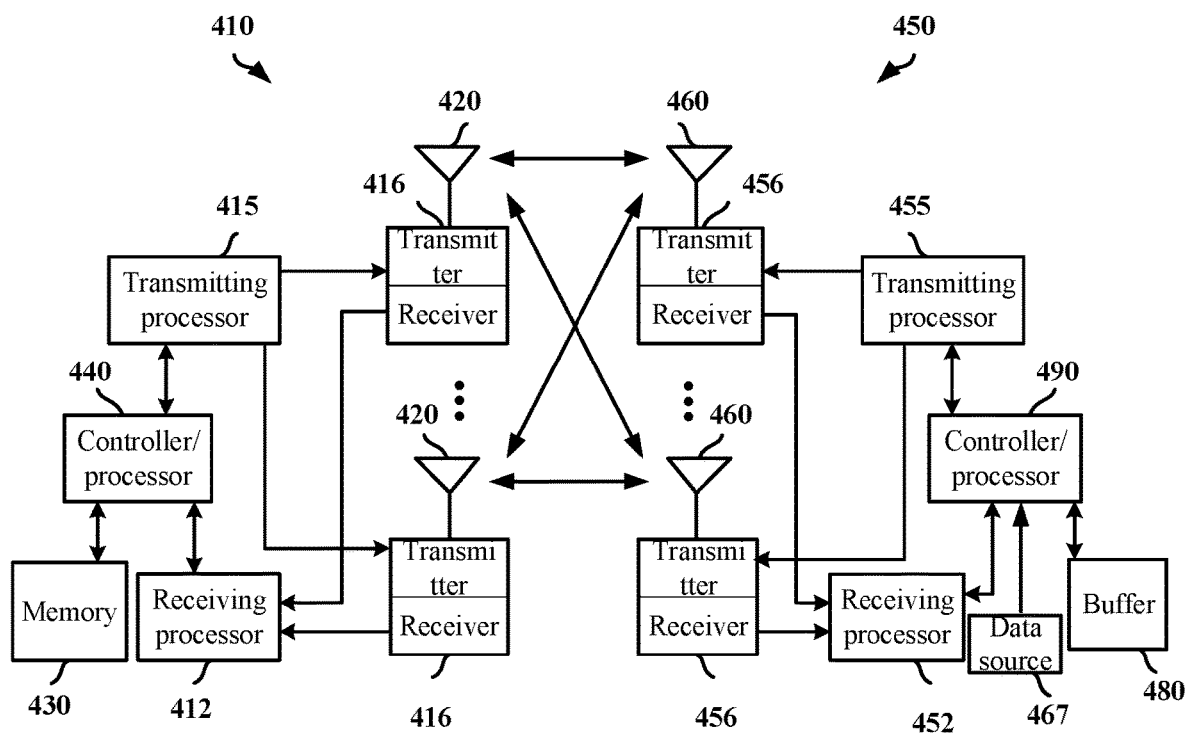
FIG. 4 illustrates a schematic diagram of a first communication node and a second communication node according to one embodiment of the present disclosure.

Embodiment 4 illustrates a schematic diagram of a base station and a given UE according to the present disclosure, as shown in FIG. 4. FIG. 4 is a block diagram of a gNB/eNB 410 in communication with a UE 450 in an access network.

The UE 450 comprises a controller/processor 490, a memory 480, a receiving processor 452, a transmitter/receiver 456, a transmitting processor 455 and a data source 467, a transmitter/receiver 456 and an antenna 460. A higher layer packet is provided to the controller/processor 490 by the data source 467, the controller/processor 490 provides header compression, encryption, packet segmentation and reordering, and a multiplexing between a logical channel and a transport channel so as to implement the L2 layer protocols used for the user plane and the control plane; the higher layer packet may comprise data or control information, such as a DL-SCH and a UL-SCH; the transmitting processor 455 performs various signal transmitting processing functions used for the L1 layer (that is, PHY), including coding, interleaving, scrambling, modulation, power control/allocation and generation of physical layer control signaling. the receiving processor 452 performs various signal receiving processing functions used for the L1 layer (that is, PHY), including decoding, deinterleaving, descrambling, demodulation, deprecoding and extraction of physical layer control signaling. The transmitter 456 is configured to convert a baseband signal provided by the transmitting processor 455 into a radio frequency (RF) signal to be transmitted via the antenna 460. The receiver 456 converts the RF signal received via the antenna 460 into a baseband signal and provides the baseband signal to the receiving processor 452.

A base station (410) comprises a controller/processor 440, a memory 430, a receiving processor 412, a transmitter/receiver 416, a transmitting processor 415, and an antenna 420. A higher layer packet is provided to the controller/processor 440, the controller/processor 440 provides header compression and decompression, encryption and decoding, packet segmentation and reordering, as well as a multiplexing between a logical channel and a transport channel so as to implement the L2 layer protocols used for the user plane and the control plane; The higher layer packet may comprise data or control information, such as DL-SCH or UL-SCH. The transmitting processor 415 provides various signal transmitting processing functions used for the L1 layer (that is, PHY), including coding, interleaving, scrambling, modulating, power control/allocation, precoding and physical layer control signaling (including synchronization signal and reference signal) generation. The receiving processor 412 provides various signaling receiving processing functions used for the L1 layer (i.e., PHY), including decoding, deinterleaving, descrambling, demodulation, deprecoding and extraction of physical layer signaling. The transmitter 416 is configured to convert a baseband signal provided by the transmitting processor 415 into a radio frequency (RF) signal to be transmitted via the antenna 420. The receiver 416 converts the RF signal received via the antenna 420 into a baseband signal and provides the baseband signal to the receiving processor 412.

In Downlink (DL) transmission, a higher-layer packet (for example, a higher-layer packet to which first information and second information in the present disclosure belong) is provided to the controller/processor 440. The controller/processor 440 implements functions of L2 layer. In DL transmission, the controller/processor 440 provides header compression, encryption, packet segmentation and reordering, multiplexing between a logical channel and a transport channel, and radio resources allocation to the UE 450 based on various priorities. The controller/processor 440 is also responsible for HARQ operation, retransmission of a lost packet, and the generation of a signaling to the UE 450, such as first information and second information in the present disclosure are generated at the controller/processor 440. The transmitting processor 415 implements various signal processing functions on the L1 layer (i.e., physical layer) and generation of signalings on the L1 layer, including coding and interleaving to ensure an FEC (Forward Error Correction) at the UE 450 side, modulating a baseband signal based on various modulation schemes (e.g., Binary Phase Shift Keying (BPSK), Quadrature Phase Shift Keying (QPSK)), dividing the modulation symbols into parallel streams and mapping each stream to a corresponding multi-carrier sub-carrier and/or a multi-carrier symbol, which are then transmitted in the form of a radio-frequency signal by the transmitting processor 415 mapping to the antenna 420 via the transmitter 416. A corresponding channel of a radio signal carrying first information and second information of the present disclosure on physical layer are mapped from the transmitting processor 415 to target radio resources and then mapped from the transmitter 416 to the antenna 420 to be transmitted in the form of RF signals. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer and reception of L1 layer signalings. The signal receiving and processing function includes receiving a physical layer signal of a radio signal carrying first information and second information in the present disclosure; demodulating based on various modulation schemes (e.g., BPSK, and QPSK) via a multi-carrier symbol in a multi-carrier symbol stream; then decoding and de-interleaving to recover a data or a control signal transmitted by the gNB410 on a physical channel, and providing the data and the control signal to the controller/processor 490. The controller/processor 490 implements the functionality of the L2 layer, the controller/processor 490 interprets the first information and the second information of the present disclosure. The controller/processor can be connected to a memory 480 that stores program code and data. The memory 480 may be called a computer readable medium.

In uplink (UL) transmission, the data source 467 is used to provide related configuration data of a signal to the controller/processor 490. The data source 467 represents all protocol layers above L2 layer, and a first radio signal and a second radio signal in the present disclosure are generated at the data source 467. The controller/processor 490 performs the L2 layer protocol for the user plane and the control plane by providing header compression, encryption, packet segmentation and reordering, as well as multiplexing between a logic channel and a transport channel through configuration allocation based on the gNB 410. the controller/processor 490 is also in charge of HARQ operation, retransmission of a lost packet, and a signaling to the gNB 410; The transmitting processor 455 performs various signal processing functions on the layer L1 (i.e., the physical layer) and signalings of the layer L1. The signal receiving and processing function includes coding, modulation, and etc.; dividing modulation symbols into parallel streams and generating a baseband signal by mapping each stream to a corresponding multicarrier subcarrier and/or a multicarrier symbol, which are then transmitted in the form of a radio-frequency signal by the transmitting processor 455 mapping to the antenna 460 via the transmitter 456; signals of the physical layer (including processing of the first sequence, the second sequence, the first radio signal and the second radio signal in the present disclosure on the physical layer) are generated at the transmitting processor 455. The receiver 416 receives a radio-frequency signal via its corresponding antenna 420, and each receiver 416 recovers baseband information modulated to a radio-frequency carrier, and supplies the baseband information to the receiving processor 412. The receiving processor 412 implements various signal receiving and processing functions used for the L1 layer (i.e., physical layer) and signalings on the layer L1, including receiving the first sequence, the first radio signal and the second sequence, determining whether to transmit a second radio signal and if so, receiving the second radio signal on PHY in the present disclosure. The signal receiving and processing function includes obtaining a multi-carrier symbol stream, then demodulating a multi-carrier symbol in the multi-carrier symbol stream based on various modulation schemes, and then decoding to recover a data and/or a control signal originally transmitted by the UE 450 on a physical channel. The data and the control signal are then provided to the controller/processor 440. The controller/processor 440 performs functions of L2 layer. The controller/processor can be connected to a memory 430 that stores program code and data. The memory 430 may be called a computer readable medium.

In one embodiment, the UE 450 corresponds to the first communication node device in the present disclosure.

In one embodiment, the gNB 410 corresponds to the second communication node in the present disclosure.

In one embodiment, the UE 450 comprises at least one processor and at least one memory. at least one processor and at least one memory. The at least one memory comprises computer program codes; the at least one memory and the computer program codes are configured to be used in collaboration with the at least one processor. The UE 450 at least: transmits a first sequence; receives first information, the first information is used to determine X candidate time lengths, X being a positive integer greater than 1; and transmits a second sequence and determines whether to transmit a second radio signal; herein, a length of a time interval between a time for transmitting the first sequence and a time for transmitting the second sequence is not less than a target time length; a first time length is equal to one of the X candidate time lengths, and the target time length is not greater than the first time length; when the first time length is greater than 0, the first communication node randomly selects the target time length between 0 and the first time length; when the first time length is equal to 0, the target time length is equal to 0; whether the second radio signal is transmitted is used to determine the first time length out of the X candidate time lengths.

In one embodiment, the UE 450 comprises a memory that stores a computer readable instruction program. The computer readable instruction program generates an action when executed by at least one processor. The action includes: transmitting a first sequence; receiving first information, the first information being used to determine X candidate time lengths, X being a positive integer greater than 1; and transmitting a second sequence and determining whether to transmit a second radio signal; herein, a length of a time interval between a time for transmitting the first sequence and a time for transmitting the second sequence is not less than a target time length; a first time length is equal to one of the X candidate time lengths, and the target time length is not greater than the first time length; when the first time length is greater than 0, the first communication node randomly selects the target time length between 0 and the first time length; when the first time length is equal to 0, the target time length is equal to 0; whether the second radio signal is transmitted is used to determine the first time length out of the X candidate time lengths.

In one embodiment, the gNB 410 comprises: at least one processor and at least one memory. The at least one memory comprises computer program codes; the at least one memory and the computer program codes are configured to be used in collaboration with the at least one processor. The gNB 410 at least: receives a first sequence; transmits first information, the first information is used to determine X candidate time lengths, X being a positive integer greater than 1; and receives a second sequence and determines whether a second radio signal is transmitted; herein, a length of a time interval between a time for transmitting the first sequence and a time for transmitting the second sequence is not less than a target time length; a first time length is equal to one of the X candidate time lengths, and the target time length is not greater than the first time length; when the first time length is greater than 0, a transmitter of the first sequence randomly selects the target time length between 0 and the first time length; when the first time length is equal to 0, the target time length is equal to 0; whether the second radio signal is transmitted is used to determine the first time length out of the X candidate time lengths.

In one embodiment, the gNB 410 comprises a memory that stores a computer readable instruction program. The computer readable instruction program generates an action when executed by at least one processor. The action includes: receiving a first sequence; transmitting first information, the first information being used to determine X candidate time lengths, X being a positive integer greater than 1; and receiving a second sequence and determining whether a second radio signal is transmitted; herein, a length of a time interval between a time for transmitting the first sequence and a time for transmitting the second sequence is not less than a target time length; a first time length is equal to one of the X candidate time lengths, and the target time length is not greater than the first time length; when the first time length is greater than 0, a transmitter of the first sequence randomly selects the target time length between 0 and the first time length; when the first time length is equal to 0, the target time length is equal to 0; whether the second radio signal is transmitted is used to determine the first time length out of the X candidate time lengths.

In one embodiment, the receiver 456 (including the antenna 460), the receiving processor 452 and the controller/processor 490 are used to receive the first information in the present disclosure.

In one embodiment, the receiver 456 (including the antenna 460), the receiving processor 452 and the controller/processor 490 are used to receive the second information in the present disclosure.

In one embodiment, the transmitter 456 (including the antenna 460), and the transmitting processor 455 are used to transmit the first sequence in the present disclosure.

In one embodiment, the transmitter 456 (including the antenna 460), and the transmitting processor 455 are used to transmit the second sequence in the present disclosure.

In one embodiment, the transmitter 456 (including the antenna 460), the transmitting processor 452 and the controller/processor 490 are used to transmit the first radio signal in the present disclosure.

In one embodiment, the controller/processor 490 is used to determine whether to transmit the second radio signal in the present disclosure.

In one embodiment, the transmitter 416 (including the antenna 420), the transmitting processor 415 and the controller/processor 440 are used for transmitting the first information in the present disclosure.

In one embodiment, the transmitter 416 (including the antenna 420), the transmitting processor 415 and the controller/processor 440 are used to transmit the second information in the present disclosure.

In one embodiment, the receiver 416 (including the antenna 420) and the receiving processor 412 are used to receive first sequence in the present disclosure.

In one embodiment, the receiver 416 (including the antenna 420), the receiving processor 412 and the controller/processor 440 are used to receive the second sequence in the present disclosure.

In one embodiment, the receiver 416 (including the antenna 420), the receiving processor 412 and the controller/processor 440 are used to receive the first radio signal in the present disclosure.

In one embodiment, the receiver 416 (including the antenna 420), the receiving processor 412 and the controller/processor 440 are used to receive the second radio signal in the present disclosure.

Embodiment 5

Figure 5:
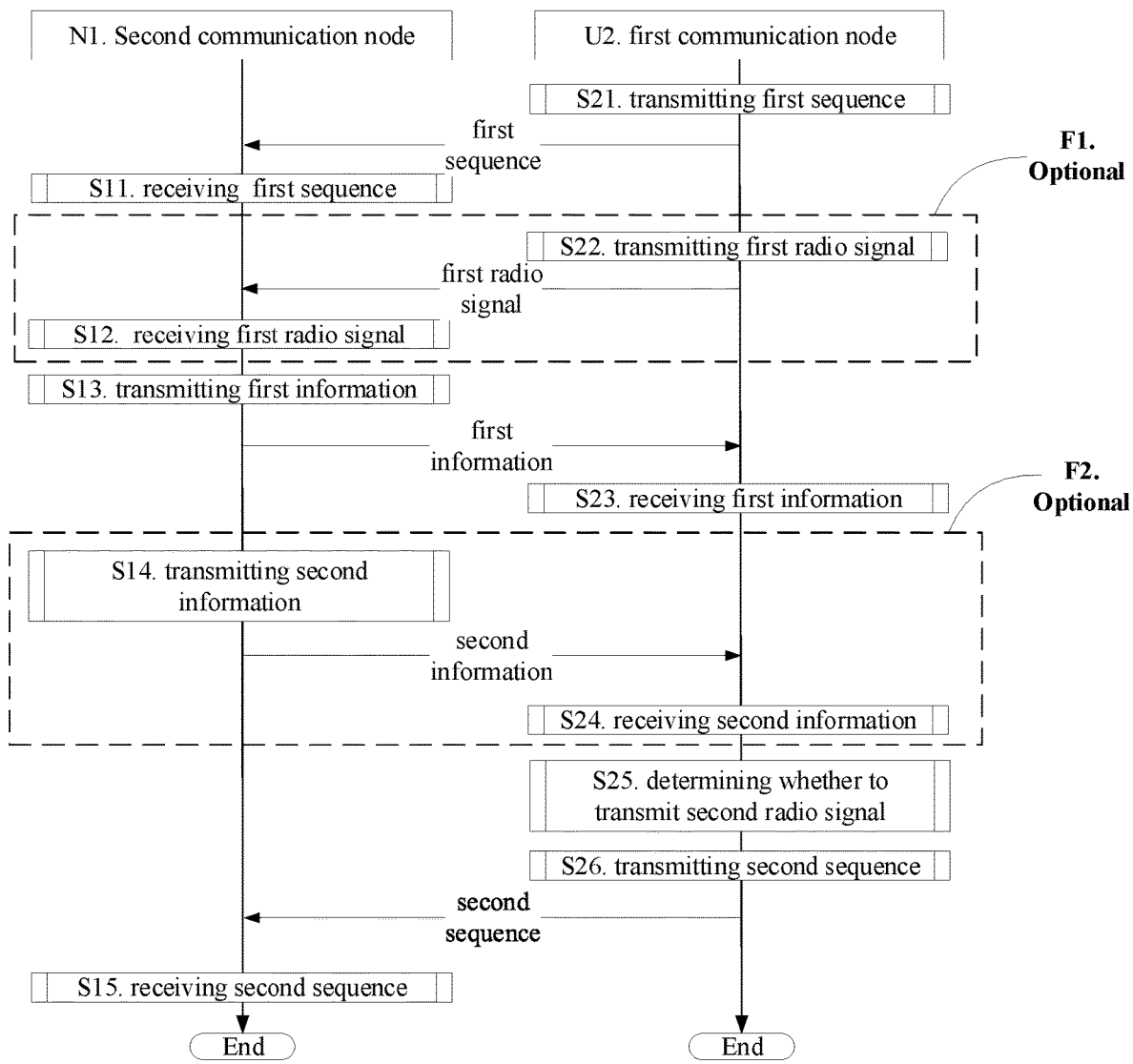
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a second communication node N1 is a maintenance base station of a serving cell of a first communication node U2, and steps in the dotted box are optional. It is particularly underlined that the order illustrated in the embodiment does not put constraints over sequences of signal transmissions and implementations.

The second communication node N1 receives a first sequence in step S11, receives a first radio signal in step S12, transmits first information in step S13, transmits second information in step S14, and receives a second sequence in step S15.

The first communication node U2 transmits a first sequence in step S21, transmits a first radio signal in step S22, receives first information in step S23, receives second information in step S24, determines whether to transmit a second radio signal in step S25, and transmits a first sequence in step S26.

In Embodiment 5, the first information is used to determine X candidate time lengths, X being a positive integer greater than 1; a length of a time interval between a time for transmitting the first sequence and a time for transmitting the second sequence is not less than a target time length; a first time length is equal to one of the X candidate time lengths, and the target time length is not greater than the first time length; when the first time length is greater than 0, the first communication node randomly selects the target time length between 0 and the first time length; when the first time length is equal to 0, the target time length is equal to 0; whether the second radio signal is transmitted is used to determine the first time length out of the X candidate time lengths; the first sequence is used to indicate at least one of time-frequency resources occupied by the first radio signal, an MCS adopted by the first radio signal or an RV adopted by the first radio signal; the first information and the second information are respectively used to determine the X candidate time lengths, X being equal to 2.

In one embodiment, the above phrase that "the first sequence is used to indicate at least one of time-frequency resources occupied by the first radio signal, an MCS adopted by the first radio signal or an RV adopted by the first radio signal" includes: the first sequence is used to indicate time-frequency resources occupied by the first radio signal, an MCS adopted by the first radio signal and an RV adopted by the first radio signal.

In one embodiment, the above phrase that "the first sequence is used to indicate at least one of time-frequency resources occupied by the first radio signal, an MCS adopted by the first radio signal or an RV adopted by the first radio signal" includes: the first sequence is used to indicate time-frequency resources occupied by the first radio signal.

In one embodiment, the above phrase that "the first sequence is used to indicate at least one of time-frequency resources occupied by the first radio signal, an MCS adopted by the first radio signal or an RV adopted by the first radio signal" includes: the first sequence is used to indicate an MCS adopted by the first radio signal.

In one embodiment, the above phrase that "the first sequence is used to indicate at least one of time-frequency resources occupied by the first radio signal, an MCS adopted by the first radio signal or an RV adopted by the first radio signal" includes: the first sequence is used to indicate an RV adopted by the first radio signal.

In one embodiment, the above phrase that "the first sequence is used to indicate at least one of time-frequency resources occupied by the first radio signal, an MCS adopted by the first radio signal or an RV adopted by the first radio signal" includes: the first sequence is used to indicate an MCS adopted by the first radio signal and an RV adopted by the first radio signal.

In one embodiment, the above phrase that "the first sequence is used to indicate at least one of time-frequency resources occupied by the first radio signal, an MCS adopted by the first radio signal or an RV adopted by the first radio signal" includes: the first sequence is used to indicate time-frequency resources occupied by the first radio signal and an RV adopted by the first radio signal.

In one embodiment, the above phrase that "the first sequence is used to indicate at least one of time-frequency resources occupied by the first radio signal, an MCS adopted by the first radio signal or an RV adopted by the first radio signal" includes: the first sequence is used to indicate time-frequency resources occupied by the first radio signal and an MCS adopted by the first radio signal.

In one embodiment, the above phrase that "the first sequence is used to indicate at least one of time-frequency resources occupied by the first radio signal, an MCS adopted by the first radio signal or an RV adopted by the first radio signal" includes: the first sequence is associated with one of time-frequency resources occupied by the first radio signal, an MCS adopted by the first radio signal or an RV adopted by the first radio signal.

In one embodiment, the above phrase that "the first sequence is used to indicate at least one of time-frequency resources occupied by the first radio signal, an MCS adopted by the first radio signal or an RV adopted by the first radio signal" includes: radio resources occupied by the first sequence are associated with one of time-frequency resources occupied by the first radio signal, an MCS adopted by the first radio signal or an RV adopted by the first radio signal, and the radio resources comprise time-frequency resources and/or code-domain resources.

In one embodiment, the above phrase that "the first sequence is used to indicate at least one of time-frequency resources occupied by the first radio signal, an MCS adopted by the first radio signal or an RV adopted by the first radio signal" includes: time-frequency resources occupied by the first sequence are associated with one of time-frequency resources occupied by the first radio signal, an MCS adopted by the first radio signal or an RV adopted by the first radio signal.

In one embodiment, the above phrase that "the first sequence is used to indicate at least one of time-frequency resources occupied by the first radio signal, an MCS adopted by the first radio signal or an RV adopted by the first radio signal" includes: code-domain resources occupied by the first sequence are associated with one of time-frequency resources occupied by the first radio signal, an MCS adopted by the first radio signal or an RV adopted by the first radio signal.

In one embodiment, the above phrase that "the first sequence is used to indicate at least one of time-frequency resources occupied by the first radio signal, an MCS adopted by the first radio signal or an RV adopted by the first radio signal" includes: the first sequence is bounded with one of time-frequency resources occupied by the first radio signal, an MCS adopted by the first radio signal or an RV adopted by the first radio signal according to the mapping relation.

In one embodiment, the above phrase that "the first sequence is used to indicate at least one of time-frequency resources occupied by the first radio signal, an MCS adopted by the first radio signal or an RV adopted by the first radio signal" includes: the first sequence has a mapping relation with one of time-frequency resources occupied by the first radio signal, an MCS adopted by the first radio signal or an RV adopted by the first radio signal.

In one embodiment, the above phrase that "the first sequence is used to indicate at least one of time-frequency resources occupied by the first radio signal, an MCS adopted by the first radio signal or an RV adopted by the first radio signal" includes: the first sequence is used to directly indicate at least one of time-frequency resources occupied by the first radio signal, an MCS adopted by the first radio signal or an RV adopted by the first radio signal.

In one embodiment, the above phrase that "the first sequence is used to indicate at least one of time-frequency resources occupied by the first radio signal, an MCS adopted by the first radio signal or an RV adopted by the first radio signal" includes: the first sequence is used to indirectly indicate at least one of time-frequency resources occupied by the first radio signal, an MCS adopted by the first radio signal or an RV adopted by the first radio signal.

In one embodiment, the above phrase that "the first sequence is used to indicate at least one of time-frequency resources occupied by the first radio signal, an MCS adopted by the first radio signal or an RV adopted by the first radio signal" includes: the first sequence is used to explicitly indicate at least one of time-frequency resources occupied by the first radio signal, an MCS adopted by the first radio signal or an RV adopted by the first radio signal.

In one embodiment, the above phrase that "the first sequence is used to indicate at least one of time-frequency resources occupied by the first radio signal, an MCS adopted by the first radio signal or an RV adopted by the first radio signal" includes: the first sequence is used to implicitly indicate at least one of time-frequency resources occupied by the first radio signal, an MCS adopted by the first radio signal or an RV adopted by the first radio signal.

In one embodiment, the first sequence and the first radio signal constitute a MsgA together.

In one embodiment, the first sequence and the first radio signal both belong to a MsgA.

In one embodiment, the first sequence and the first radio signal both belong to a MsgA in a 2-Step RACH.

In one embodiment, the first radio signal is transmitted through an Uplink Shared Channel (UL-SCH).

In one embodiment, the first radio signal is transmitted through a Physical Uplink Shared Channel (PUSCH).

In one embodiment, the first radio signal is obtained after a TB is sequentially subjected to CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation, and Modulation and Upconversion.

In one embodiment, the first radio signal is obtained after a TB is sequentially subjected to CRC Insertion, Segmentation, coding block-level CRC Insertion, Channel Coding, Rate Matching, Concatenation, Scrambling, Modulation, Layer Mapping, Precoding, Mapping to Virtual Resource Blocks, Mapping from Virtual to Physical Resource Blocks, OFDM Baseband Signal Generation, and Modulation and Upconversion.

In one embodiment, the first radio signal is obtained after a TB is sequentially subjected to CRC Insertion, Channel Coding, Rate Matching, Scrambling, Modulation, Layer Mapping, Transform Precoding, Precoding, Mapping to Virtual Resource Blocks, Mapping from Virtual to Physical Resource Blocks, OFDM Baseband Signal Generation, and Modulation and Upconversion.

In one embodiment, the first radio signal is obtained after a TB is sequentially subjected to CRC Insertion, Segmentation, coding block-level CRC Insertion, Channel Coding, Rate Matching, Concatenation, Scrambling, Modulation, Layer Mapping, Transform Precoding, Precoding, Mapping to Virtual Resource Blocks, Mapping from Virtual to Physical Resource Blocks, OFDM Baseband Signal Generation, and Modulation and Upconversion.

In one embodiment, the first radio signal comprises a Physical Uplink Shared Channel (PUSCH) and a Demodulation Reference Signal (DMRS).

In one embodiment, the first radio signal only comprises a Physical Uplink Shared Channel (PUSCH).

Embodiment 6

Figure 6:
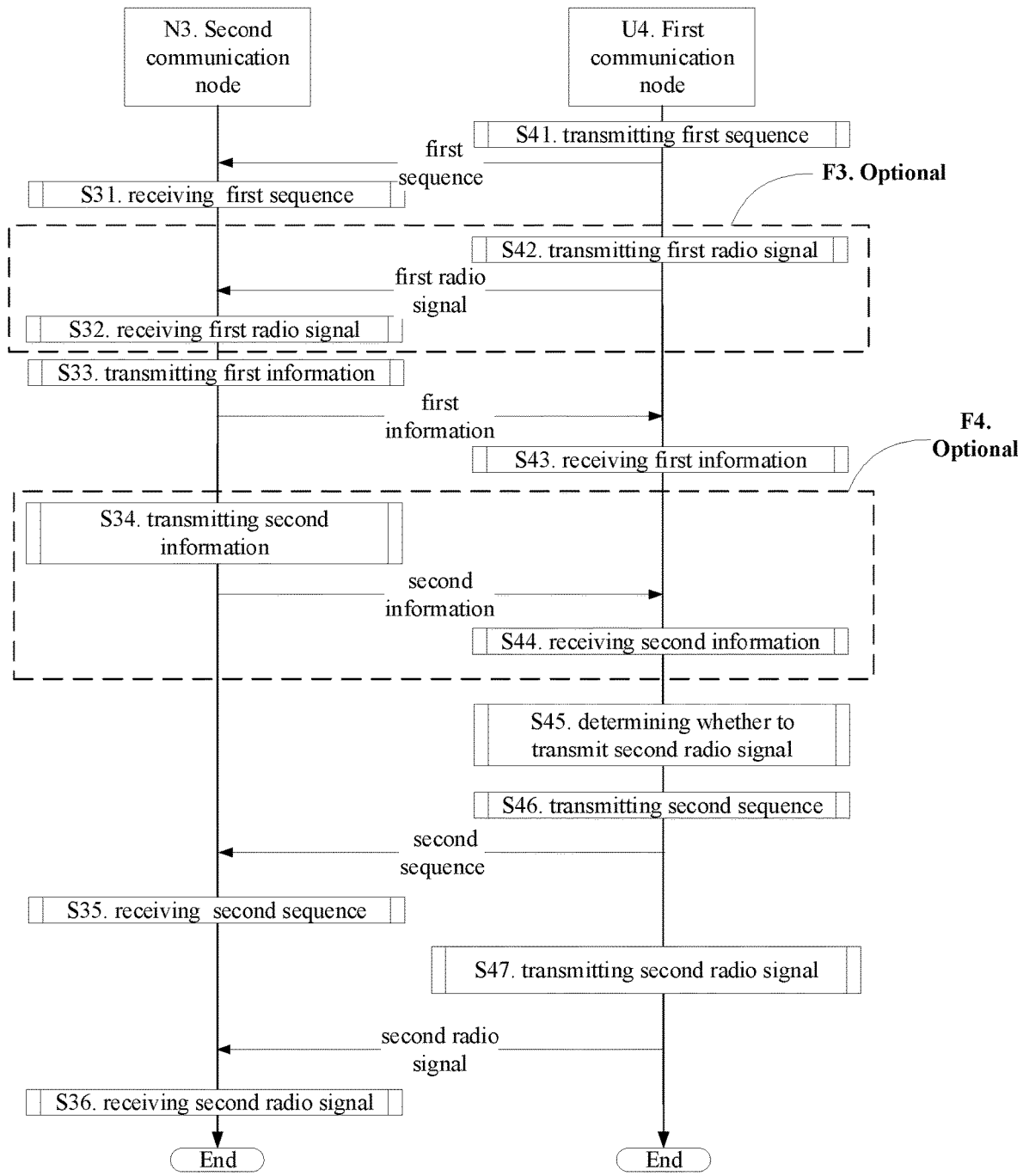
FIG. 6 illustrates a flowchart of radio signal transmission according to another embodiment of the present disclosure.

Embodiment 6 illustrates a flowchart of radio signal transmission according to another embodiment of the present disclosure, as shown in FIG. 6. In FIG. 6, the second node N3 is a maintenance base station of a serving cell of the first communication node U4, and steps in dotted box are optional. It is particularly underlined that the order illustrated in the embodiment does not put constraints over sequences of signal transmissions and implementations.

The second communication node N3 receives a first sequence in step S31, receives a first radio signal in step S32, transmits first information in step S33, transmits second information in step S34, receives a second sequence in step S35, and receives a second radio signal in step S36.

The first communication node U4 transmits a first sequence in step S41, transmits a first radio signal in step S42, receives first information in step S43, receives second information in step S44, determines whether to transmit a second radio signal in step S45, transmits a second sequence in step S46, and transmits a second radio signal in step S47.

In Embodiment 6, the first information is used to determine X candidate time lengths, X being a positive integer greater than 1; a length of a time interval between a time for transmitting the first sequence and a time for transmitting the second sequence is not less than a target time length; a first time length is equal to one of the X candidate time lengths, and the target time length is not greater than the first time length; when the first time length is greater than 0, the first communication node randomly selects the target time length between 0 and the first time length; when the first time length is equal to 0, the target time length is equal to 0; whether the second radio signal is transmitted is used to determine the first time length out of the X candidate time lengths; the first sequence is used to indicate at least one of time-frequency resources occupied by the first radio signal, an MCS adopted by the first radio signal or an RV adopted by the first radio signal; the second sequence is used to indicate at least one of time-frequency resources occupied by the second radio signal, an MCS adopted by the second radio signal or an RV adopted by the second radio signal; the first information and the second information are respectively used to determine the X candidate time lengths, X being equal to 2.

In one embodiment, the above phrase that "the second sequence is used to indicate at least one of time-frequency resources occupied by the second radio signal, an MCS adopted by the second radio signal or an RV adopted by the second radio signal" includes: the second sequence is used to indicate time-frequency resources occupied by the second radio signal, an MCS adopted by the second radio signal and an RV adopted by the second radio signal.

In one embodiment, the above phrase that "the second sequence is used to indicate at least one of time-frequency resources occupied by the second radio signal, an MCS adopted by the second radio signal or an RV adopted by the second radio signal" includes: the second sequence is used to indicate time-frequency resources occupied by the second radio signal.

In one embodiment, the above phrase that "the second sequence is used to indicate at least one of time-frequency resources occupied by the second radio signal, an MCS adopted by the second radio signal or an RV adopted by the second radio signal" includes: the second sequence is used to indicate an MCS adopted by the second radio signal.

In one embodiment, the above phrase that "the second sequence is used to indicate at least one of time-frequency resources occupied by the second radio signal, an MCS adopted by the second radio signal or an RV adopted by the second radio signal" includes: the second sequence is used to indicate an RV adopted by the second radio signal.

In one embodiment, the above phrase that "the second sequence is used to indicate at least one of time-frequency resources occupied by the second radio signal, an MCS adopted by the second radio signal or an RV adopted by the second radio signal" includes: the second sequence is used to indicate an MCS adopted by the second radio signal and an RV adopted by the second radio signal.

In one embodiment, the above phrase that "the second sequence is used to indicate at least one of time-frequency resources occupied by the second radio signal, an MCS adopted by the second radio signal or an RV adopted by the second radio signal" includes: the second sequence is used to indicate time-frequency resources occupied by the second radio signal and an RV adopted by the second radio signal.

In one embodiment, the above phrase that "the second sequence is used to indicate at least one of time-frequency resources occupied by the second radio signal, an MCS adopted by the second radio signal or an RV adopted by the second radio signal" includes: the second sequence is used to indicate time-frequency resources occupied by the second radio signal and an MCS adopted by the first radio signal.

In one embodiment, the above phrase that "the second sequence is used to indicate at least one of time-frequency resources occupied by the second radio signal, an MCS adopted by the second radio signal or an RV adopted by the second radio signal" includes: the second sequence is associated with one of time-frequency resources occupied by the second radio signal, an MCS adopted by the second radio signal or an RV adopted by the second radio signal.

In one embodiment, the above phrase that "the second sequence is used to indicate at least one of time-frequency resources occupied by the second radio signal, an MCS adopted by the second radio signal or an RV adopted by the second radio signal" includes: the second sequence is bounded with one of time-frequency resources occupied by the second radio signal, an MCS adopted by the second radio signal or an RV adopted by the second radio signal according to the mapping relation.

In one embodiment, the above phrase that "the second sequence is used to indicate at least one of time-frequency resources occupied by the second radio signal, an MCS adopted by the second radio signal or an RV adopted by the second radio signal" includes: the second sequence has a mapping relation with one of time-frequency resources occupied by the second radio signal, an MCS adopted by the second radio signal or an RV adopted by the second radio signal.

In one embodiment, the above phrase that "the second sequence is used to indicate at least one of time-frequency resources occupied by the second radio signal, an MCS adopted by the second radio signal or an RV adopted by the second radio signal" includes: the second sequence is used to directly indicate at least one of time-frequency resources occupied by the second radio signal, an MCS adopted by the second radio signal or an RV adopted by the second radio signal.

In one embodiment, the above phrase that "the second sequence is used to indicate at least one of time-frequency resources occupied by the second radio signal, an MCS adopted by the second radio signal or an RV adopted by the second radio signal" includes: the second sequence is used to indirectly indicate at least one of time-frequency resources occupied by the second radio signal, an MCS adopted by the second radio signal or an RV adopted by the second radio signal.

In one embodiment, the above phrase that "the second sequence is used to indicate at least one of time-frequency resources occupied by the second radio signal, an MCS adopted by the second radio signal or an RV adopted by the second radio signal" includes: the second sequence is used to explicitly indicate at least one of time-frequency resources occupied by the second radio signal, an MCS adopted by the second radio signal or an RV adopted by the second radio signal.

In one embodiment, the above phrase that "the second sequence is used to indicate at least one of time-frequency resources occupied by the second radio signal, an MCS adopted by the second radio signal or an RV adopted by the second radio signal" includes: the second sequence is used to implicitly indicate at least one of time-frequency resources occupied by the second radio signal, an MCS adopted by the second radio signal or an RV adopted by the second radio signal.

In one embodiment, the second sequence and the second radio signal constitute a MsgA together.

In one embodiment, the second sequence and the second radio signal both belong to a MsgA.

In one embodiment, the second sequence and the second radio signal both belong to a MsgA in a 2-Step RACH.

In one embodiment, high-layer information carried by the first radio signal and the second radio signal is the same.

In one embodiment, high-layer information carried by the first radio signal and the second radio signal is different.

Embodiment 7

Figures 7, 8:
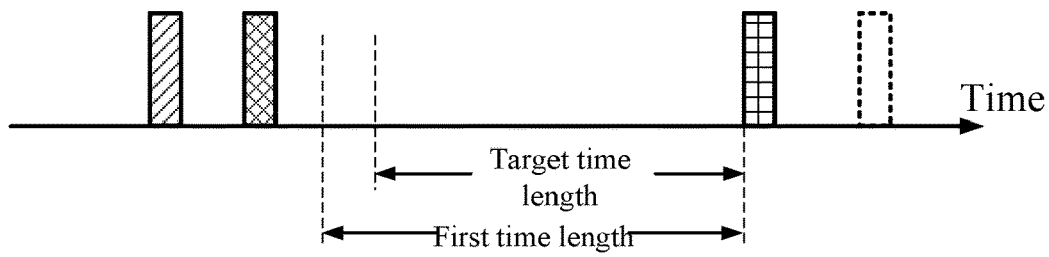
FIG. 7 illustrates a schematic diagram of a relation between a target time length and a first time length according to one embodiment of the present disclosure.
FIG. 8 illustrates a schematic diagram of X time length sets according to one embodiment of the present disclosure.

Embodiment 7 illustrates a schematic diagram of a relation between a target time length and a first time length according to one embodiment of the present disclosure, as shown in FIG. 7. In FIG. 7, the horizontal axis represents time, the slash-filled rectangle represents a first sequence, the cross-line-filled rectangle represents first information, the reticle-filled rectangle represents a second sequence, and the dotted rectangle represents a second radio signal that may be transmitted.

In Embodiment 7, the first communication node in the present disclosure first transmits a first sequence; then receives first information, the first information being used to determine X candidate time lengths, X being a positive integer greater than 1; and transmits a second sequence and determines whether to transmit a second radio signal; herein, a length of a time interval between a time for transmitting the first sequence and a time for transmitting the second sequence is not less than a target time length; a first time length is equal to one of the X candidate time lengths, and the target time length is not greater than the first time length; when the first time length is greater than 0, the first communication node randomly selects the target time length between 0 and the first time length; when the first time length is equal to 0, the target time length is equal to 0; whether the second radio signal is transmitted is used to determine the first time length out of the X candidate time lengths.

In one embodiment, a length of a time interval between a time when an RA procedure with the first sequence as a preamble sequence is determined as not completed and a time for initiating an RA procedure with the second sequence as a preamble sequence is not less than the target time length.

In one embodiment, a length of a time interval between a time when an RA procedure with the first sequence as a preamble sequence is determined as not completed and a start time for initiating an RA resource selection in an RA procedure with the second sequence as a preamble sequence is not less than the target time length.

In one embodiment, a length of a time interval between a start time for initiating an RA resource selection in an RA procedure with the first sequence as a preamble sequence and a start time for initiating an RA resource selection in an RA procedure with the second sequence as a preamble sequence is not less than the target time length.

In one embodiment, a length of a time interval between an end time for transmitting the first information and a start time for transmitting the second sequence is not less than the target time length.

In one embodiment, time-domain resources occupied by the first information belong to a first time window, and a length of a time interval between an end time of the first time window and a start time for transmitting the second sequence is not less than the target time length.

In one embodiment, time-domain resources occupied by the first information belong to a first time window, and a length of a time interval between a start time of the first time window and a start time for transmitting the second sequence is not less than the target time length.

In one embodiment, time-domain resources occupied by the first information belong to a first time window, the first communication node assumes that the first information is only received in the first time window, and a length of a time interval between an end time of the first time window and a start time for transmitting the second sequence is not less than the target time length.

In one embodiment, time-domain resources occupied by the first information belong to a first time window, the first communication node assumes that the first information is only received in the first time window, and a length of a time interval between a start time of the first time window and a start time for transmitting the second sequence is not less than the target time length.

In one embodiment, time-domain resources occupied by the first information belong to a first time window, the first time window is an RAR Window, and a length of a time interval between a start time of the first time window to a start time for transmitting the second sequence is not less than the target time length.

In one embodiment, time-domain resources occupied by the first information belong to a first time window, the first time window is an RAR Window, and a length of time interval between an end time of the first time window to a start time for transmitting the second sequence is not less than the target time length.

In one embodiment, the first information is a response (RAR or MsgB) for the first sequence, a response time window for the first sequence (RAR window or MsgB Monitoring Window) is a first time window, and a length of a time interval between an end time of the first time window and a start time for transmitting the second sequence is not less than the target time length.

In one embodiment, the first information is a response (RAR or MsgB) for the first sequence, a response time window for the first sequence (RAR window or MsgB Monitoring Window) is a first time window, and a length of a time interval between a start time of the first time window and a start time for transmitting the second sequence is not less than the target time length.

Embodiment 8

Embodiment 8 illustrates a schematic diagram of X time length sets according to one embodiment of the present disclosure, as shown in FIG. 8. In FIG. 8, the first column on the left represents an index indicated by first information, the second column on the left represents one of X time lengths, the third column on the left represents another one of the X time length sets, and candidate time lengths in X time length sets in a blackened row indexed as 7 represent X candidate time lengths.

In embodiment 8, the X candidate time lengths in the present disclosure respectively belong to X time length sets, and the first information in the present disclosure is used to respectively determine the X candidate time lengths out of the X time length sets; and any of the X time length sets comprises more than one candidate time length.

In one embodiment, each of the X time length sets is predefined.

In one embodiment, each of the X time length sets is fixed.

In one embodiment, there exists one of the X time length sets being configured.

In one embodiment, there exist two of the X time lengths being different.

In one embodiment, any two of the X time lengths being different.

In one embodiment, candidate time lengths in any two of the X time length sets respectively correspond each other.

In one embodiment, there exist candidate time lengths in two of the X time length sets respectively corresponding each other.

In one embodiment, there exist candidate time lengths in two of the X time length sets having a one-to-one mapping relation.

In one embodiment, there exist candidate time lengths in two of the X time length sets having a one-to-one functional operation relation.

In one embodiment, there exist candidate time lengths in two of the X time length sets having a one-to-one proportional relation.

In one embodiment, candidate time lengths in any of the X time length sets are indexed in order.

In one embodiment, candidate time lengths in any of the X time length sets are indexed in order, and indexes of the X candidate time lengths respectively in time length sets to which they belong are equal.

In one embodiment, any candidate time length in any of the X time length sets is not less than 0.

In one embodiment, the above phrase of "the first information being used to respectively determine the X candidate time lengths in the X time length sets" includes: the first information is used by the first communication node to respectively determine the X candidate time lengths in the X time length sets.

In one embodiment, the above phrase of "the first information being used to respectively determine the X candidate time lengths in the X time length sets" includes: the first information is used to respectively and directly indicate the X candidate time lengths in the X time length sets.

In one embodiment, the above phrase of "the first information being used to respectively determine the X candidate time lengths in the X time length sets" includes: the first information is used to respectively and indirectly indicate the X candidate time lengths in the X time length sets.

In one embodiment, the above phrase of "the first information being used to respectively determine the X candidate time lengths in the X time length sets" includes: the first information is used to respectively and implicitly indicate the X candidate time lengths in the X time length sets.

In one embodiment, the above phrase of "the first information being used to respectively determine the X candidate time lengths in the X time length sets" includes: the first information is used to respectively and explicitly indicate the X candidate time lengths in the X time length sets.

In one embodiment, the above phrase of "the first information being used to respectively determine the X candidate time lengths in the X time length sets" includes: candidate time lengths in any of the X time length sets are indexed in order, and indexes of the X candidate time lengths respectively in time length sets to which they belong are equal, and the first information indicates indexes of the X candidate time lengths respectively in time length sets to which they belong.

In one embodiment, the above phrase of "the first information being used to respectively determine the X candidate time lengths in the X time length sets" includes: candidate time lengths in any of the X time length sets are indexed in order, and each of indexes of the X candidate time lengths respectively in time length sets to which they belong is equal to a first index, and the first information indicates the first index.

In one embodiment, the above phrase of "the first information being used to respectively determine the X candidate time lengths in the X time length sets" includes: candidate time lengths of any two of the X time length sets respectively correspond to each other, the first information indicates a third time length out of the X candidate time lengths, the third time length is one of the X candidate time lengths; based on a one-to-one corresponding relation of candidate time lengths of any two of the X time length sets, the first information is used to determine a candidate time length other than the third time length in the X candidate time lengths.

In one embodiment, one of the X time length sets consists of Backoff Parameter values in 3GPP TS38.321 (v15.3.0), section 7.2, table 7.2-1.

Embodiment 9

Figures 9, 10:
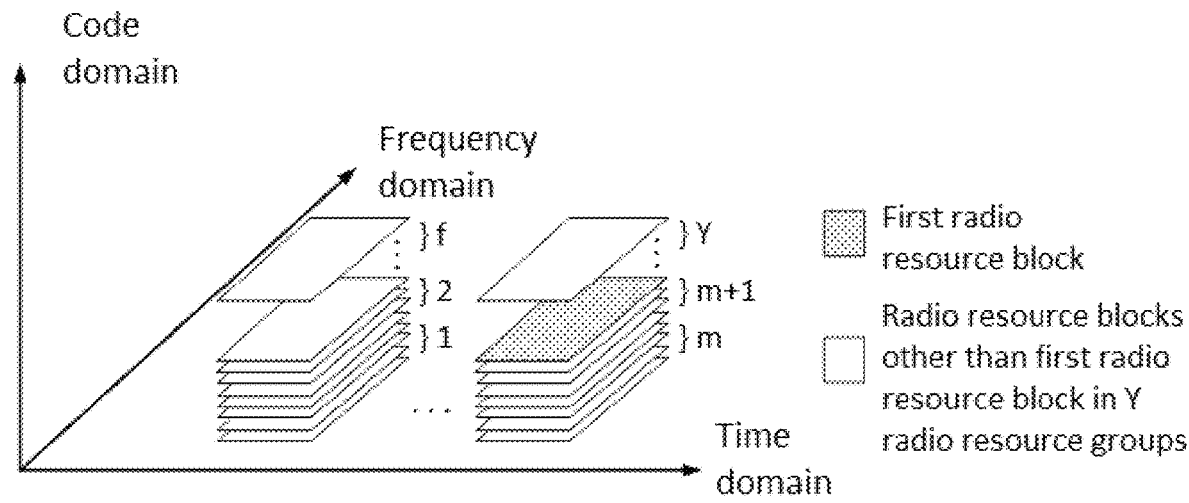
FIG. 9 illustrates a schematic diagram of Y radio resource groups according to one embodiment of the present disclosure.
FIG. 10 illustrates a schematic diagram of a relation between a first time length and a second time length according to one embodiment of the present disclosure.

Embodiment 9 illustrates a schematic diagram of Y radio resource groups according to one aspect of the present disclosure, as shown in FIG. 9. In FIG. 9, the horizontal axis represents time domain, the vertical axis represents frequency domain, the vertical axis represents code domain, the filled rectangle represents a first radio resource block, each unfilled rectangle represents a radio resource block other than a first radio resource block in Y radio resource groups, and symbols of "1, 2, . . . , f, . . . , m, m+1, . . . , Y" in the figure represent indexes of Y radio resource groups.

In Embodiment 9, radio resources occupied by the second sequence in the present disclosure belong to a first radio resource block, the first radio resource block belongs to a first radio resource group, and the first radio resource group is one of Y radio resource groups, Y being a positive integer greater than 1; whether the second radio signal in the present disclosure is transmitted is used to determine the first radio resource group out of the Y radio resource groups.

In one embodiment, the first radio resource block comprises time-frequency resources and code-domain resources.

In one embodiment, the first radio resource block comprises time-frequency resources.

In one embodiment, the first radio resource block comprises code-domain resources.

In one embodiment, the first radio resource block comprises a characteristic sequence generating the second sequence and time-frequency resources transmitting the second sequence.

In one embodiment, the first radio resource block comprises a characteristic sequence generating the second sequence.

In one embodiment, the first radio resource block comprises time-frequency resources occupied by the second sequence.

In one embodiment, the first radio resource group comprises more than one radio resource block.

In one embodiment, the first radio resource group only comprises a first radio resource block.

In one embodiment, the first radio resource group comprises more than one radio resource block, and each radio resource block comprised in the first radio resource group comprises time-frequency resources and code-domain resources.

In one embodiment, the first radio resource group comprises more than one radio resource block, and each radio resource block comprised in the first radio resource group comprises time-frequency resources.

In one embodiment, the first radio resource group comprises more than one radio resource block, and each radio resource block comprised in the first radio resource group comprises code-domain resources.

In one embodiment, the Y radio resource groups are obtained by partitioning all radio resources that can be used for Physical Random Access Channel (PRACH) transmission.

In one embodiment, the Y radio resource groups are obtained by partitioning all code-domain resources that can be used for Physical Random Access Channel (PRACH) transmission.

In one embodiment, the Y radio resource groups are obtained by partitioning all configured preamble sequences.

In one embodiment, any two radio resource blocks in any two of the Y radio resource groups are orthogonal.

In one embodiment, any two radio resource blocks in any two of the Y radio resource groups are non-overlapped.

In one embodiment, the Y is equal to 2, and radio resource blocks in the Y radio resource groups are respectively used for a 2-Step RACH and a 4-Step RACH.

In one embodiment, the Y is equal to 2, and the Y radio resource groups are respectively used for a 2-Step RACH and a 4-Step RACH.

In one embodiment, the Y radio resource groups are configured.

In one embodiment, the Y radio resource groups are pre-defined.

In one embodiment, the Y radio resource groups are configured via a System Information Block (SIB).

In one embodiment, the first communication node selects the first radio resource out of a first radio resource group by itself.

In one embodiment, the first communication node randomly selects the first radio resource out of a first radio resource group.

In one embodiment, the first communication node randomly selects the first radio resource out of a first radio resource group at equal probability.

In one embodiment, the above phrase that "whether the second radio signal is transmitted is used to determine the first radio resource group in the Y radio resource groups" includes: whether the second radio signal is transmitted is used by the first communication node to determine the first radio resource group out of the Y radio resource groups.

In one embodiment, the above phrase that "whether the second radio signal is transmitted is used to determine the first radio resource group in the Y radio resource groups" includes: whether the second radio signal is transmitted is used to directly indicate the first radio resource group out of the Y radio resource groups.

In one embodiment, the above phrase that "whether the second radio signal is transmitted is used to determine the first radio resource group in the Y radio resource groups" includes: whether the second radio signal is transmitted is used to indirectly indicate the first radio resource group out of the Y radio resource groups.

In one embodiment, the above phrase that "whether the second radio signal is transmitted is used to determine the first radio resource group in the Y radio resource groups" includes: whether the second radio signal is transmitted is used to explicitly indicate the first radio resource group out of the Y radio resource groups.

In one embodiment, the above phrase that "whether the second radio signal is transmitted is used to determine the first radio resource group in the Y radio resource groups" includes: whether the second radio signal is transmitted is used to implicitly indicate the first radio resource group out of the Y radio resource groups.

In one embodiment, the above phrase that "whether the second radio signal is transmitted is used to determine the first radio resource group in the Y radio resource groups" includes: whether the first communication node initiates a 2-Step RACH or a 4-Step RACH is used to determine the first radio resource group out of the Y radio resource groups.

In one embodiment, the above phrase that "whether the second radio signal is transmitted is used to determine the first radio resource group in the Y radio resource groups" includes: only whether the second radio signal is transmitted is used to determine the first radio resource group out of the Y radio resource groups.

In one embodiment, the above phrase that "whether the second radio signal is transmitted is used to determine the first radio resource group in the Y radio resource groups" includes: whether the second radio signal is transmitted and other factors are used together to determine the first radio resource group out of the Y radio resource groups.

In one embodiment, the above phrase that "whether the second radio signal is transmitted is used to determine the first radio resource group in the Y radio resource groups" includes: the Y is equal to 2, and when the second radio signal is transmitted, the first radio signal is one of the Y radio resource groups, otherwise the first radio resource group is another one of the Y radio resource groups.

In one embodiment, the above phrase that "whether the second radio signal is transmitted is used to determine the first radio resource group in the Y radio resource groups" includes: the Y is equal to 2, and when the first communication node initiates a 2-Step RACH, the first radio resource group is one of the Y radio resource groups; when the first communication node initiates a 4-Step RACH, the first radio resource group is another one of the Y radio resource groups.

In one embodiment, the above phrase that "whether the second radio signal is transmitted is used to determine the first radio resource group in the Y radio resource groups" includes: whether the second radio signal is transmitted and a state of the first communication node (RRC_IDLE, RRC_CONNECTED or RRC_INACTIVE) are used together to determine the first radio resource group out of the Y radio resource groups.

In one embodiment, the above phrase that "whether the second radio signal is transmitted is used to determine the first radio resource group in the Y radio resource groups" includes: whether the second radio signal is transmitted and a reason for triggering a transmission of the second sequence (Beam Failure Recovery, Handover or other) are used together to determine the first radio resource group out of the Y radio resource groups.

Embodiment 10

Embodiment 10 illustrates a schematic diagram of a relation of a first time length and a second time length according to one embodiment of the present disclosure, as shown in FIG. 10. In FIG. 10, the first column on the left represents an index indicated by first information, the second column on the left represents one of X time length sets, the third column on the left represents another one of X time lengths, the blackened number in the second column on the left (corresponds to index "6") is a second time length, the blackened number in the third column on the left (corresponds to index "6") is a first time length, and a first factor is equal to 32/80=0.4.

In Embodiment 10, a second time length is equal to a candidate time length other than the first time length in the X candidate time lengths in the present disclosure, and the first time length is equal to a product of the second time length and a first factor; the first factor is fixed, or the first factor is configured.

In one embodiment, one of the X time length sets in the present disclosure to which the first time length belongs is a first time length set, one of the X time length sets in the present disclosure to which the second time length belongs is a second time length set, candidate time lengths in the first time length set respectively correspond to candidate time lengths in the second time length set, and any candidate time length in the first time length set is equal to a product of a candidate time length corresponding to the second time length set and the first factor.

In one embodiment, the first time length is greater than the second time length.

In one embodiment, the first time length is equal to the second time length.

In one embodiment, the first time length is not equal to the second time length.

In one embodiment, the first time length is less than the second time length.

In one embodiment, the second time length is measured by ms.

In one embodiment, the second time length is expressed in terms of slots.

In one embodiment, the second time length is expressed in terms of a number of multicarrier symbols.

In one embodiment, the second time length is expressed in terms of a number of subframes.

In one embodiment, the first factor is greater than or equal to 0.

In one embodiment, the first factor is equal to 0.
In one embodiment, the first factor is less than 1.
In one embodiment, the first factor is equal to 1.
In one embodiment, the first factor is greater than 1.
In one embodiment, the first factor is greater than or equal to 1.

In one embodiment, the first factor is less than or equal to 1.

In one embodiment, the first factor is a non-negative real number.

In one embodiment, the above phrase that "the first factor is fixed" includes: a value of the first factor is not changed.

In one embodiment, the above phrase that "the first factor is fixed" includes: a value of the first factor is predefined in the protocol.

In one embodiment, the above phrase that "the first factor is fixed" includes: a value of the first factor is hardcoded.

In one embodiment, the above phrase that "the first factor is configured" includes: the first receiver also receives third information, where the third information is used to indicate the first factor.

In one embodiment, the above phrase that "the first factor is configured" includes: the first receiver also receives third information, where the third information is used to indicate the first factor, and the third information is a System Information Block (SIB).

In one embodiment, the above phrase that "the first factor is configured" includes: the first receiver also receives third information, where the third information is used to indicate the first factor, and the third information is broadcast information of high layer.

In one embodiment, the above phrase that "the first factor is configured" includes: the first receiver also receives third information, where the third information is used to indicate the first factor, and the third information is all or part of an RRC signaling.

In one embodiment, the above phrase that "the first factor is configured" includes: the first receiver also receives third information, the first receiver also receives third information, where the third information is used to determine a number of preambles available for a 2-Step RACH and preambles available for a 4-Step RACH, and the first factor is equal to a ratio of a number of preambles available for the 2-Step RACH to a number of preambles available for the 4-Step RACH.

In one embodiment, the above phrase that "the first factor is configured" includes: the first receiver also receives third information, the first receiver also receives third information, where the third information is used to determine a number of preambles available for a 2-Step RACH and preambles available for a 4-Step RACH, and the first factor is proportional to a ratio of a number of preambles available for the 2-Step RACH to a number of preambles available for the 4-Step RACH.

In one embodiment, the above phrase that "the first factor is configured" includes: the first receiver also receives third information, the first receiver also receives third information, where the third information is used to determine a number of preambles available for a 2-Step RACH and preambles available for a 4-Step RACH, and the first factor is inversely proportional to a ratio of a number of preambles available for the 2-Step RACH to a number of preambles available for the 4-Step RACH.

In one embodiment, the above phrase that "the first factor is configured" includes: the first receiver also receives third information, where a second radio resource group is one of the Y radio resource groups in the present disclosure other than the first radio resource group in the present disclosure, the third information is used to determine the first radio resource group and the second radio resource group in the present disclosure, and the first factor is equal to a ratio of a number of radio resource blocks comprised in the first radio resource group to a number of radio resource blocks comprised in the second radio resource group.

In one embodiment, the above phrase that "the first factor is configured" includes: the first receiver also receives third information, where a second radio resource group is one of the Y radio resource groups in the present disclosure other than the first radio resource group in the present disclosure, the third information is used to determine the first radio resource group and the second radio resource group in the present disclosure, and the first factor is proportional to a ratio of a number of radio resource blocks comprised in the first radio resource group to a number of radio resource blocks comprised in the second radio resource group.

In one embodiment, the above phrase that "the first factor is configured" includes: the first receiver also receives third information, where a second radio resource group is one of the Y radio resource groups in the present disclosure other than the first radio resource group in the present disclosure, the third information is used to determine the first radio resource group and the second radio resource group in the present disclosure, and the first factor is inversely proportional to a ratio of a number of radio resource blocks comprised in the first radio resource group to a number of radio resource blocks comprised in the second radio resource group.

Embodiment 11

Embodiment 11 illustrates a schematic diagram of a relation of first information and second information according to one embodiment of the present disclosure, as shown in FIG. 11. In FIG. 11, the first column on the left represents an index indicated by first information, the second column on the left represents time length sets in X time length sets corresponding to first information, the third column on the left represents an index indicated by second information, the fourth column on the left represents time length sets in X time length sets corresponding to second information, the blackened number in the second column on the left (corresponding to an index of "7" indicated by first information) is a candidate time length in X candidate time lengths determined by first information, and a blackened number in the fourth column on the left (corresponding to an index of "5" indicated by second information) is a candidate time length in X candidate time lengths determined by second information.

In one embodiment, the second information is transmitted via a higher-layer signaling.

In one embodiment, the second information is transmitted via a physical-layer signaling.

In one embodiment, the second information comprises all or part of a high-layer signaling.

In one embodiment, the second information comprises all or part of a physical-layer signaling.

In one embodiment, the second information comprises all or partial IEs in an RRC signaling.

In one embodiment, the second information comprises all or partial fields in an IE in a RRC signaling.

In one embodiment, the second information comprises all or partial fields in a MAC layer signaling.

In one embodiment, the second information comprises all or part of a MAC CE.

In one embodiment, the second information comprises all or part of a MAC Header.

In one embodiment, the second information comprises all or part of an RAR MAC payload.

In one embodiment, the second information comprises all or part of a MAC PDU in an RAR.

In one embodiment, the second information comprises all or part of a subheader in an RAR.

In one embodiment, the second information comprises all or part of a MAC CE in an RAR.

In one embodiment, the second information comprises all or part of a Msg4.

In one embodiment, the second information comprises all or part of a Msg4 in a 4-Step RACH.

In one embodiment, the second information comprises all or part of a MsgB in a 2-Step RACH.

In one embodiment, the second information comprises all or part of a MAC payload in a MsgB in a 2-Step RACH.

In one embodiment, the second information comprises all or part of a MAC PDU in a MsgB in a 2-Step RACH.

In one embodiment, the second information comprises all or part of a MAC SDU in a MsgB in a 2-Step RACH.

In one embodiment, the second information comprises all or part of a subheader in a MsgB in a 2-Step RACH.

In one embodiment, the second information comprises all or part of a MAC CE in a MsgB in a 2-Step RACH.

In one embodiment, the second information is transmitted through a DL-SCH.

In one embodiment, the second information is transmitted through a PDSCH.

In one embodiment, the second information is transmitted through a PDSCH, and an RA-RNTI is used to generate an initial value of a generator of a scrambling sequence of a PDSCH carrying the second information.

In one embodiment, the second information is transmitted through a PDSCH, and a TC-RNTI is used to generate an initial value of a generator of a scrambling sequence of a PDSCH carrying the second information.

In one embodiment, the second information is transmitted through a PDSCH, and an identity other than an RA-RNTI and a TC-RNTI is used to generate an initial value of a generator of a scrambling sequence of a PDSCH carrying the second information.

In one embodiment, the second information is transmitted through a PDSCH, and a MsgB-RNTI is used to generate an initial value of a generator of a scrambling sequence of a PDSCH carrying the second information.

In one embodiment, the second information is Broadcast.

In one embodiment, the second information is Unicast.

In one embodiment, the second information is Groupcast.

In one embodiment, the second information is Cell-Specific.

In one embodiment, the second information is UE-specific.

In one embodiment, the second information is UE group-specific.

In one embodiment, the second information is transmitted through a PDCCH.

In one embodiment, the second information comprises all or partial fields of a DCI signaling.

In one embodiment, the first information and the second information in the present disclosure are transmitted through a same PDSCH.

In one embodiment, the first information and the second information in the present disclosure are transmitted through two different PDSCHs.

In one embodiment, the first information and the second information in the present disclosure are transmitted through a same MAC PDU.

In one embodiment, the first information and the second information in the present disclosure are transmitted through different MAC PDUs.

In one embodiment, the first information and the second information in the present disclosure are in a same MAC subheader.

In one embodiment, the first information and the second information in the present disclosure are in different MAC subheaders.

In one embodiment, one of the first information or the second information in the present disclosure is carried by a MAC subheader, and the other one is carried by a MAC CE.

In one embodiment, one of the first information or the second information in the present disclosure is carried by a MAC subheader, and the other one is carried by a MAC SDU.

In one embodiment, the above phrase that "the first information and the second information are respectively used to determine the X candidate time lengths" includes: the first information is used to determine one of the X candidate time lengths, and the second information is used to determine another of the X candidate time lengths.

In one embodiment, the above phrase that "the first information and the second information are respectively used to determine the X candidate time lengths" includes: the first information and the second information are respectively used by the first communication node to determine the X candidate time lengths.

In one embodiment, the above phrase that "the first information and the second information are respectively used to determine the X candidate time lengths" includes: the first information and the second information are respectively used to directly indicate the X candidate time lengths.

In one embodiment, the above phrase that "the first information and the second information are respectively used to determine the X candidate time lengths" includes: the first information and the second information are respectively used to indirectly indicate the X candidate time lengths.

In one embodiment, the above phrase that "the first information and the second information are respectively used to determine the X candidate time lengths" includes: the first information and the second information are respectively used to explicitly indicate the X candidate time lengths.

In one embodiment, the above phrase that "the first information and the second information are respectively used to determine the X candidate time lengths" includes: the first information and the second information are respectively used to implicitly indicate the X candidate time lengths.

In one embodiment, the second information is transmitted via an air interface.

In one embodiment, the second information is transmitted via a radio interface.

In one embodiment, the second information is transmitted through a radio channel.

In one embodiment, the second information is transmitted via a Uu interface.

In one embodiment, the second information is transmitted via an interface between the second communication node and the first communication node in the present disclosure.

Embodiment 12

Figure 12:
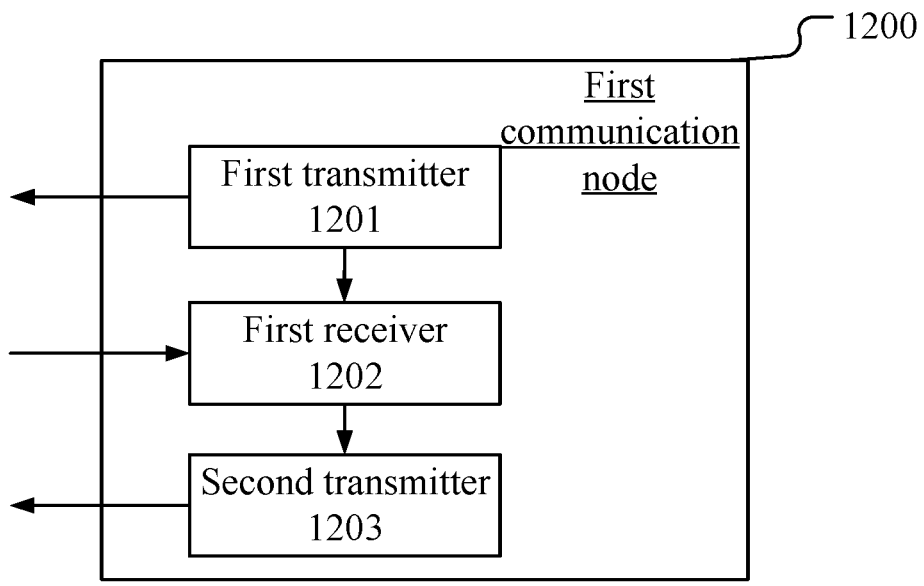
FIG. 12 illustrates a structure block diagram of a processing device in a first communication node according to one embodiment of the present disclosure.

Embodiment 12 illustrates a structure diagram of a processing device in a first communication node, as shown in FIG. 12. In FIG. 12, a processing device 1200 of the first communication node comprises a first transmitter 1201, a first receiver 1202 and a second transmitter 1203. The first transmitter 1201 comprises the transmitter/receiver 456 (including the antenna 460), the transmitting processor 455 and the controller/processor 490 in FIG. 4 of the present disclosure; the first receiver 1202 comprises the transmitter/receiver 456 (including the antenna 460), the receiving processor 452 and the controller/processor 490 in FIG. 4 of the present disclosure; the second transmitter 1203 comprises the transmitter/receiver 456 (including the antenna 460), the transmitting processor 455 and the controller/processor 490 in FIG. 4 of the present disclosure.

In Embodiment 12, the first transmitter 1201 transmits a first sequence; the first receiver 1202 receives first information, the first information is used to determine X candidate time lengths, X being a positive integer greater than 1; the second transmitter 1203 transmits a second sequence and determines whether to transmit a second radio signal; herein, a length of a time interval between a time for transmitting the first sequence and a time for transmitting the second sequence is not less than a target time length; a first time length is equal to one of the X candidate time lengths, and the target time length is not greater than the first time length; when the first time length is greater than 0, the first communication node randomly selects the target time length between 0 and the first time length; when the first time length is equal to 0, the target time length is equal to 0; whether the second radio signal is transmitted is used to determine the first time length out of the X candidate time lengths.

In one embodiment, the first transmitter 1201 also transmits a first radio signal, the first sequence is used to indicate at least one of time-frequency resources occupied by the first radio signal, an MCS adopted by the first radio signal or an RV adopted by the first radio signal.

In one embodiment, the X candidate time lengths respectively belong to X time length sets, and the first information is used to respectively determine the X candidate time lengths in the X time length sets; any of the X time length sets comprises more than one candidate time length.

In one embodiment, radio resources occupied by the second sequence belong to a first radio resource block, the first radio resource block belongs to a first radio resource group, and the first radio resource group is one of Y radio resource groups, Y being a positive integer greater than 1; whether the second radio signal is transmitted is used to determine the first radio resource group out of the Y radio resource groups.

In one embodiment, the second transmitter 1203 also transmits a second radio signal; the second sequence is used to indicate at least one of time-frequency resources occupied by the second radio signal, a MCS adopted by the second radio signal or an RV adopted by the second radio signal.

In one embodiment, a second time length is equal to a candidate time length other than the first time length in the X candidate time lengths, and the first time length is equal to a product of the second time length and a first factor; the first factor is fixed, or the first factor is configured.

In one embodiment, the first receiver 1202 also receives second information, the first information and the second information are respectively used to determine the X candidate time lengths, X being equal to 2.

Embodiment 13

Figure 13:
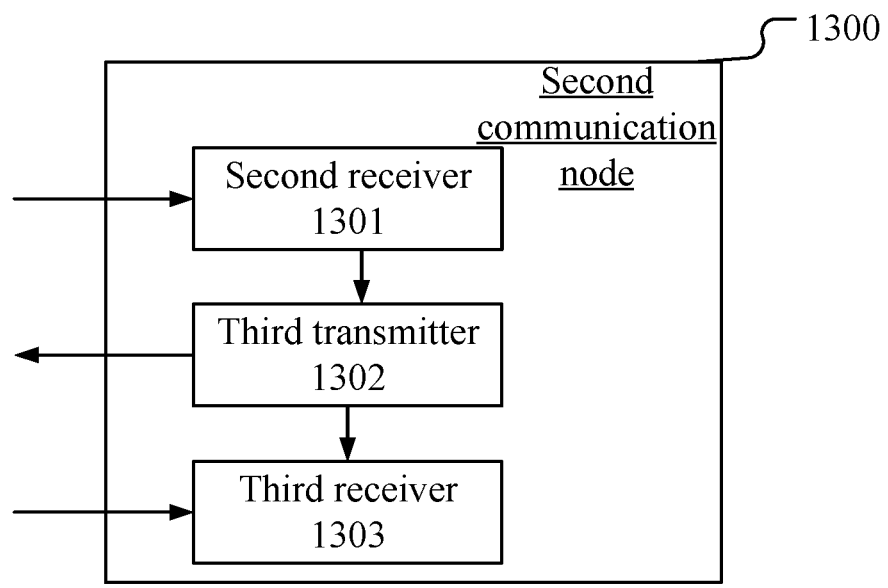
FIG. 13 illustrates a structure block diagram of a processing device in a second communication node according to one embodiment of the present disclosure.

Embodiment 13 illustrates a structure block diagram of a processing device in a second communication node, as shown in FIG. 13. In FIG. 13, the processing device 1300 of the second communication node comprises a second receiver 1301, a third transmitter 1302 and a third receiver 1303. the second receiver 1301 comprises the transmitter/receiver 416 (including the antenna 420), the receiving processor 412 and the controller/processor 440 in FIG. 4 of the present disclosure; the third transmitter 1302 comprises the transmitter/receiver 416 (including the antenna 420), the transmitting processor 415 and the controller/processor 440 in FIG. 4 of the present disclosure; the third receiver 1303 comprises the transmitter/receiver 416 (including the antenna 420), the receiving processor 412 and the controller/processor 440 in FIG. 4 of the present disclosure.

In Embodiment 13, the second receiver 1301 receives a first sequence; a third transmitter 1302 transmits first information, the first information is used to determine X candidate time lengths, X being a positive integer greater than 1; and a third receiver 1303 receives a second sequence and determines whether a second radio signal is transmitted; herein, a length of a time interval between a time for transmitting the first sequence and a time for transmitting the second sequence is not less than a target time length; a first time length is equal to one of the X candidate time lengths, and the target time length is not greater than the first time length; when the first time length is greater than 0, a transmitter of the first sequence randomly selects the target time length between 0 and the first time length; when the first time length is equal to 0, the target time length is equal to 0; whether the second radio signal is transmitted is used to determine the first time length out of the X candidate time lengths.

In one embodiment, the second receiver 1301 also receives a first radio signal, the first sequence is used to indicate at least one of time-frequency resources occupied by the first radio signal, an MCS adopted by the first radio signal or an RV adopted by the first radio signal.

In one embodiment, the X candidate time lengths respectively belong to X time length sets, and the first information is used to respectively determine the X candidate time lengths in the X time length sets; any of the X time length sets comprises more than one candidate time length.

In one embodiment, radio resources occupied by the second sequence belong to a first radio resource block, the first radio resource block belongs to a first radio resource group, and the first radio resource group is one of Y radio resource groups, Y being a positive integer greater than 1; whether the second radio signal is transmitted is used to determine the first radio resource group out of the Y radio resource groups.

In one embodiment, the third receiver 1303 also receives a second radio signal; the second sequence is used to indicate at least one of time-frequency resources occupied by the second radio signal, a MCS adopted by the second radio signal or an RV adopted by the second radio signal.

In one embodiment, a second time length is equal to a candidate time length other than the first time length in the X candidate time lengths, and the first time length is equal to a product of the second time length and a first factor; the first factor is fixed, or the first factor is configured.

In one embodiment, the third transmitter 1302 also transmits second information, the first information and the second information are respectively used to determine the X candidate time lengths, X being equal to 2.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. A first-type communication node or a UE or a terminal in the present disclosure includes but not limited to mobile phones, tablet computers, laptops, network cards, low-power devices, eMTC devices, NB-IOT devices, vehicle-mounted communication equipment, aircrafts, airplanes, unmanned aerial vehicles (UAV), telecontrolled aircrafts and other wireless communication devices. The second-type communication node or the base station or the network side device in the present disclosure includes but is not limited to the macro-cellular base stations, micro-cellular base stations, home base stations, relay base stations, eNB, gNB, Transmitting and Receiving Point (TRP), relay satellites, satellite base stations, air base stations and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE) for wireless communications, comprising:
  a processor;
  a memory connected to the processor;
  a transmitter configured to:
    transmit a first preamble sequence in a first 2-step random access procedure, wherein the 2-step random access procedure is not successful or not completed; and
    transmit a first radio signal including a Physical Uplink Shared Channel (PUSCH) and a Demodulation Reference Signal (DMRS);
    wherein the first preamble maps to time-frequency resources occupied by the first radio signal and radio resources occupied by the first preamble sequence are associated with the time-frequency resources occupied by the first radio signal; and
  a receiver configured to receive first information carried by a Physical Downlink Shared Channel (PDSCH), the PDSCH using a scrambling sequence based on a Message B Radio Network Temporary Identifier (MsgB-RNTI), wherein the first information is used to determine a candidate time length;
  wherein the processor is configured to:
    select either a second 2-step random access procedure or a 4-step random access procedure as a selected random access procedure; and
    determine a backoff time based on the selected random access procedure, wherein on a condition that the selected random access procedure is the 4-step random access procedure, the backoff time is zero, and on a condition that the selected random access procedure is the second 2-step random access procedure, the backoff time is a randomly selected time greater than zero and no greater than the candidate time length;
  wherein the transmitter is further configured to transmit a second preamble sequence as part of initiating the selected random access procedure using the backoff time.

2. The UE of claim 1, wherein radio resources occupied by the second preamble sequence belong to a first radio resource block, the first radio resource block belongs to a first radio resource group, and the first radio resource group is one of a plurality of radio resource groups; wherein the first radio resource group is determined out of the plurality of radio resource groups based on whether the second preamble sequence is transmitted.

3. The UE of claim 2, wherein either:
the first radio resource group is further determined out of the plurality of radio resource groups based on a state of the UE, wherein the state of the UE includes Radio Resource Control (RRC) IDLE (RRC_IDLE), RRC_CONNECTED, and RRC_INACTIVE;
or
the first radio resource group is further determined out of the plurality of radio resource groups based on a reason for triggering a transmission of the second preamble sequence.

4. The UE of claim 1, wherein the receiver is further configured to receive broadcast second information, wherein the first information, the second information, or the first and the second information are used to determine the candidate time length; wherein the first information includes at least a part of a subheader in a MsgB in the first 2-step random access procedure, or the first information includes at least a part of a Control Element (CE) in a MsgB in the first 2-step random access procedure; wherein the second information includes at least one field of an information element (IE) in a Radio Resource Control (RRC) signal; and wherein the first information is transmitted using a different Physical Downlink Shared Channel (PDSCH) than the second information.

5. The UE of claim 1, wherein the UE is in a Radio Resource Control (RRC) INACTIVE (RRC_INACTIVE) state, and the first preamble sequence is finished transmission no later than a start time for receiving the first information.

6. The UE of claim 1, wherein the first information is a Message B (MsgB) for the first preamble sequence, and a length of a time interval between an end time of a response time window for the first sequence and a start time for transmitting the second preamble sequence is not less than the backoff time; and wherein the UE randomly selects the backoff time according to a uniform distribution between 0 and the candidate time length.

7. A base station for wireless communications, the base station comprising:
a processor;
a memory connected to the processor;
a receiver configured to:
receive a first preamble sequence from a user equipment (UE) in a first 2-step random access procedure, wherein the 2-step random access procedure is not successful or not completed; and
receive a first radio signal including a Physical Uplink Shared Channel (PUSCH) and a Demodulation Reference Signal (DMRS);
wherein the first preamble maps to time-frequency resources occupied by the first radio signal and radio resources occupied by the first preamble sequence are associated with the time-frequency resources occupied by the first radio signal; and
a transmitter configured to transmit first information carried by a Physical Downlink Shared Channel (PDSCH) to the UE, the PDSCH using a scrambling sequence based on a Message B Radio Network Temporary Identifier (MsgB-RNTI), wherein the first information is used to determine a candidate time length;
wherein the receiver is further configured to receive a second preamble sequence from the UE, based on a backoff time, that initiates a second 2-step random access procedure or to initiate a 4-step random access procedure, wherein the backoff time is based on whether the second preamble sequence initiates the second 2-step random access procedure or the 4-step random access procedure, and wherein on a condition that the second 2-step random access procedure is initiated, the backoff time is a randomly selected time greater than zero and no greater than the candidate time length and on a condition that the 4-step random access procedure is initiated, the backoff time is zero.

8. The base station of claim 7, wherein radio resources occupied by the second preamble sequence belong to a first radio resource block, the first radio resource block belongs to a first radio resource group, and the first radio resource group is one of a plurality of radio resource groups; wherein the first radio resource group, out of the plurality of radio resource groups, is based on whether the second preamble sequence is transmitted.

9. The base station of claim 8, wherein the first radio resource group, out of the plurality of radio resource groups, is further based on a state of the UE, wherein the state of the UE includes Radio Resource Control (RRC) IDLE (RRC_IDLE), RRC_CONNECTED, and RRC_INACTIVE;
or
the first radio resource group, out of the plurality of radio resource groups, is further based on a reason a transmission of the second preamble sequence is triggered.

10. The base station of claim 7, wherein the transmitter is further configured to broadcast second information, wherein the first information, the second information, or the first and the second information are used to determine the candidate time length; wherein the first information includes at least a part of a subheader in a MsgB in the first 2-step random access procedure, or the first information includes at least a part of a Control Element (CE) in a MsgB in the first 2-step random access procedure; wherein the second information includes at least one field of an information element (IE) in a Radio Resource Control (RRC) signal; and wherein the first information is transmitted using a different Physical Downlink Shared Channel (PDSCH) than the second information.

11. The base station of claim 7, wherein the first information is a Message B (MsgB) for the first preamble sequence, and a length of a time interval between an end time of a response time window and a start time for a transmission of the second preamble sequence is not less than the backoff time; wherein the backoff time is a randomtime length according to a uniform distribution between 0 and the candidate time length.

12. A method performed by a equipment (UE) for wireless communications, comprising:
transmitting a first preamble sequence in a first 2-step random access procedure, wherein the 2-step random access procedure is not successful or not completed;
transmitting a first radio signal including a Physical Uplink Shared Channel (PUSCH) and a Demodulation Reference Signal (DMRS);
wherein the first preamble maps to time-frequency resources occupied by the first radio signal and radio resources occupied by the first preamble sequence are associated with the time-frequency resources occupied by the first radio signal;

receiving first information carried by a Physical Downlink Shared Channel (PDSCH), the PDSCH using a scrambling sequence based on a Message B Radio Network Temporary Identifier (MsgB-RNTI), wherein the first information is used to determine a candidate time length;

selecting either a second 2-step random access procedure or a 4-step random access procedure as a selected random access procedure;

determining a backoff time based on the selected random access procedure, wherein on a condition that the selected random access procedure is the 4-step random access procedure, the backoff time is zero, and on a condition that the selected random access procedure is the second 2-step random access procedure, the backoff time is a randomly selected time greater than zero and no greater than the candidate time length; and transmitting a second preamble sequence as part of initiating the selected random access procedure using the backoff time.

13. The method of claim 12, wherein radio resources occupied by the second preamble sequence belong to a first radio resource block, the first radio resource block belongs to a first radio resource group, and the first radio resource group is one of a plurality of radio resource groups; wherein the first radio resource group is determined out of the plurality of radio resource groups based on whether the second preamble sequence is transmitted.

14. The method of claim 13, wherein either:

the first radio resource group is further determined out of the plurality of radio resource groups based on a state of the UE, wherein the state of the UE includes Radio Resource Control (RRC) IDLE (RRC_IDLE), RRC_CONNECTED, and RRC_INACTIVE;

or the first radio resource group is further determined out of the plurality of radio resource groups based on a reason for triggering a transmission of the second preamble sequence.

15. The method of claim 12, comprising:

receiving second broadcast second information, wherein the first information, the second information, or the first and the second information are used to determine the candidate time length; wherein the first information includes at least a part of a subheader in a MsgB in the first 2-step random access procedure, or the first information includes at least a part of a Control Element (CE) in a MsgB in the first 2-step random access procedure; wherein the second information includes at least one field of an information element (IE) in a Radio Resource Control (RRC) signal; and wherein the first information is transmitted using a different Physical Downlink Shared Channel (PDSCH) than the second information.

16. The method of claim 12, wherein the UE is in a Radio Resource Control (RRC) INACTIVE (RRC_INACTIVE) state, and the first preamble sequence is finished transmission no later than a start time for receiving the first information.

17. The method of claim 12, wherein the first information is a Message B (MsgB) for the first preamble sequence, and a length of a time interval between an end time of a response time window for the first sequence and a start time for transmitting the second preamble sequence is not less than the backoff time; and wherein the UE randomly selects the backoff time according to a uniform distribution between 0 and the candidate time length.

* * * * *